United States Patent
Nakada et al.

(10) Patent No.: US 10,947,884 B2
(45) Date of Patent: Mar. 16, 2021

(54) EXHAUST PURIFICATION DEVICE AND CONTROL METHOD FOR SAME

(71) Applicant: ISUZU MOTORS LIMITED, Tokyo (JP)

(72) Inventors: Teruo Nakada, Yokohama (JP); Takayuki Sakamoto, Fujisawa (JP); Daiji Nagaoka, Kamakura (JP)

(73) Assignee: ISUZU MOTORS LIMITED, Tokyo (JP)

( * ) Notice: Subject to any disclaimer, the term of this patent is extended or adjusted under 35 U.S.C. 154(b) by 623 days.

(21) Appl. No.: 15/560,684

(22) PCT Filed: Mar. 23, 2016

(86) PCT No.: PCT/JP2016/059123
§ 371 (c)(1),
(2) Date: Sep. 22, 2017

(87) PCT Pub. No.: WO2016/152896
PCT Pub. Date: Sep. 29, 2016

(65) Prior Publication Data
US 2018/0106178 A1    Apr. 19, 2018

(30) Foreign Application Priority Data

Mar. 25, 2015  (JP) .............................. JP2015-062527

(51) Int. Cl.
*F01N 9/00* (2006.01)
*F01N 3/08* (2006.01)
(Continued)

(52) U.S. Cl.
CPC ............. *F01N 9/002* (2013.01); *B01D 53/94* (2013.01); *B01D 53/96* (2013.01); *F01N 3/0814* (2013.01);
(Continued)

(58) Field of Classification Search
CPC ..... B01D 53/94; B01D 53/96; F01N 2260/04; F01N 2430/06; F01N 2560/026;
(Continued)

(56) References Cited

U.S. PATENT DOCUMENTS

2005/0076635 A1    4/2005  Suyama et al.
2005/0252198 A1*  11/2005  Okugawa ............ F02D 41/0245
                                                                    60/284
(Continued)

FOREIGN PATENT DOCUMENTS

EP          2578833 A2    4/2013
JP       2005-133703 A    5/2005
(Continued)

OTHER PUBLICATIONS

Notification of Reasons for Refusal for related JP App No. 2015-062527 dated Oct. 9, 2018, 8 pgs.
(Continued)

*Primary Examiner* — Phutthiwat Wongwian
*Assistant Examiner* — Diem T Tran
(74) *Attorney, Agent, or Firm* — Procopio, Cory, Hargreaves & Savitch LLP

(57) ABSTRACT

The present invention is provided with: a SOx purge control unit that executes catalyst regeneration processing that maintains the temperature of a NOx occlusion/reduction catalyst at a prescribed recovery temperature; a catalyst temperature estimation unit that estimates catalyst temperature on the basis of the amount of unburnt fuel contained in exhaust and of a catalyst heat generation amount; a second exhaust temperature sensor that is arranged further to an exhaust downstream side than the catalyst and that detects exhaust temperature; and a heat generation amount correction value setting unit that, during the execution of the catalyst regeneration processing, on the basis of an esti-
(Continued)

mated catalyst temperature estimated by the catalyst temperature estimation unit and of an actual exhaust temperature detected by the second exhaust temperature sensor, obtains a heat generation amount correction value that is used to correct the heat generation amount of the catalyst.

3 Claims, 15 Drawing Sheets

(51) Int. Cl.

| | | |
|---|---|---|
| F02D 41/02 | (2006.01) | |
| B01D 53/94 | (2006.01) | |
| B01D 53/96 | (2006.01) | |
| F02D 41/04 | (2006.01) | |
| F01N 3/035 | (2006.01) | |
| F01N 3/023 | (2006.01) | |

(52) U.S. Cl.
CPC ......... *F01N 3/0842* (2013.01); *F01N 3/0885* (2013.01); *F01N 9/00* (2013.01); *F01N 9/005* (2013.01); *F02D 41/0235* (2013.01); *F02D 41/04* (2013.01); *F01N 3/023* (2013.01); *F01N 3/035* (2013.01); *F01N 2260/04* (2013.01); *F01N 2430/06* (2013.01); *F01N 2560/026* (2013.01); *F01N 2560/027* (2013.01); *F01N 2560/06* (2013.01); *F01N 2610/03* (2013.01); *F01N 2900/0408* (2013.01); *F01N 2900/1404* (2013.01); *F01N 2900/1602* (2013.01); *F01N 2900/1631* (2013.01); *Y02T 10/40* (2013.01)

(58) Field of Classification Search
CPC ........... F01N 2560/027; F01N 2560/06; F01N 2610/03; F01N 2900/0408; F01N 2900/1404; F01N 2900/1602; F01N 2900/1631; F01N 3/023; F01N 3/035; F01N 3/0814; F01N 3/0842; F01N 3/0885; F01N 9/00; F01N 9/002; F01N 9/005; F02D 41/0235; F02D 41/04; Y02T 10/47

See application file for complete search history.

(56) References Cited

U.S. PATENT DOCUMENTS

| | | | |
|---|---|---|---|
| 2006/0225407 A1* | 10/2006 | Tahara | ................... F01N 3/0253 60/286 |
| 2007/0125072 A1 | 6/2007 | McCarthy, Jr. et al. | |
| 2007/0125073 A1 | 6/2007 | Reuter | |
| 2007/0209351 A1 | 9/2007 | Chimner et al. | |
| 2009/0049824 A1 | 2/2009 | Kojima et al. | |
| 2010/0023292 A1* | 1/2010 | Willard | ................... G01D 18/00 702/89 |
| 2010/0132635 A1 | 6/2010 | McCarthy, Jr. et al. | |
| 2011/0271659 A1* | 11/2011 | Umemoto | ............... F01N 3/085 60/276 |
| 2012/0204629 A1 | 8/2012 | Sata et al. | |

FOREIGN PATENT DOCUMENTS

| | | |
|---|---|---|
| JP | 2008-202425 A | 9/2008 |
| JP | 2009-047086 A | 3/2009 |
| JP | 2009517599 A | 4/2009 |
| JP | 2011-99398 A | 5/2011 |
| JP | 2012-202271 A | 10/2012 |
| JP | 2014-218982 A | 11/2014 |
| WO | 2007063406 A2 | 6/2007 |

OTHER PUBLICATIONS

International Search Report and Written Opinion for PCT App No. PCT/JP2016/059123 dated Jun. 28, 2016, 9 pgs.
Extended European Search Report for related EP App No. 16768799.5 dated Aug. 2, 2018, 7 pgs.

* cited by examiner

[FIG.1]
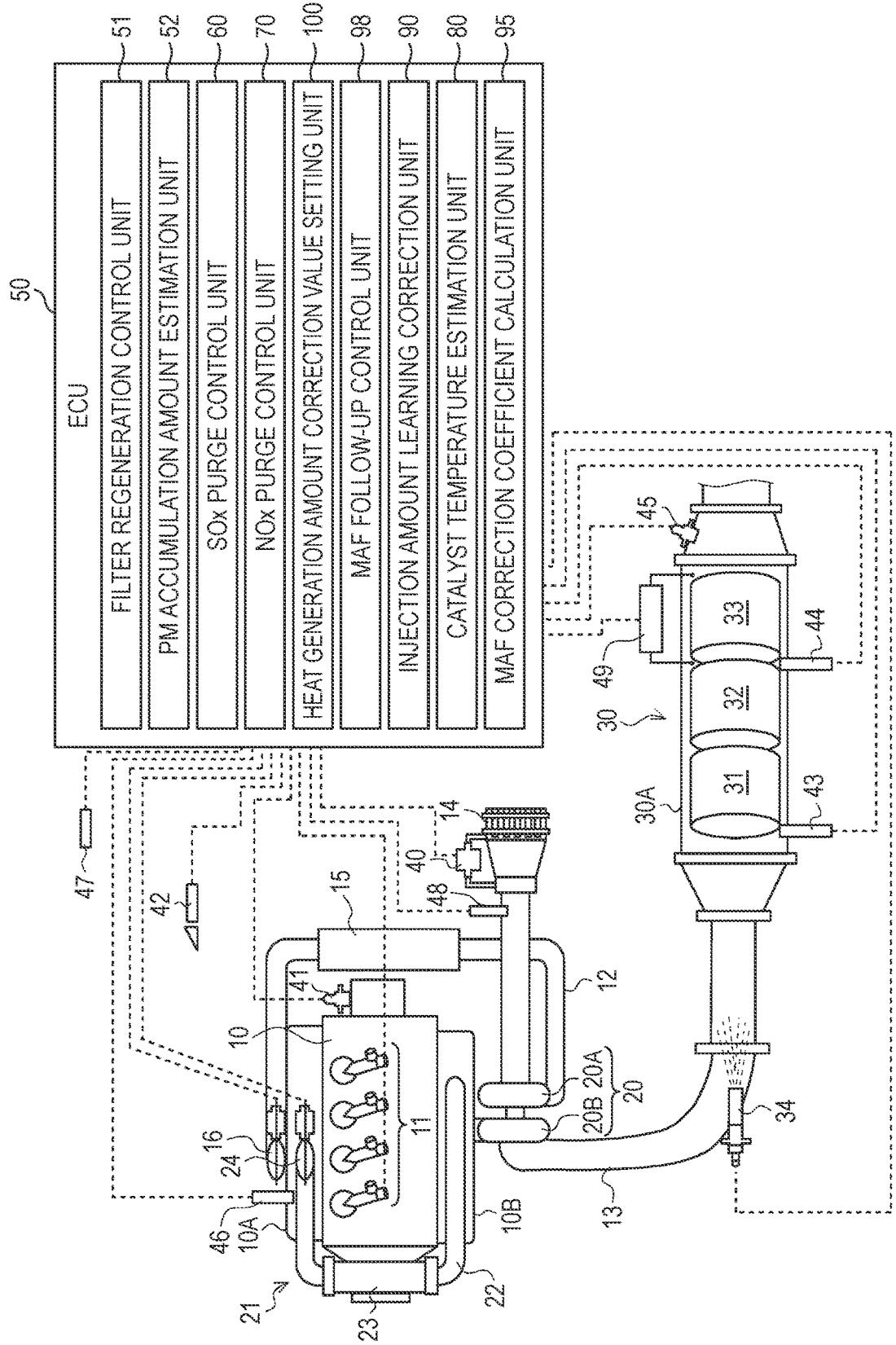

[FIG.2]
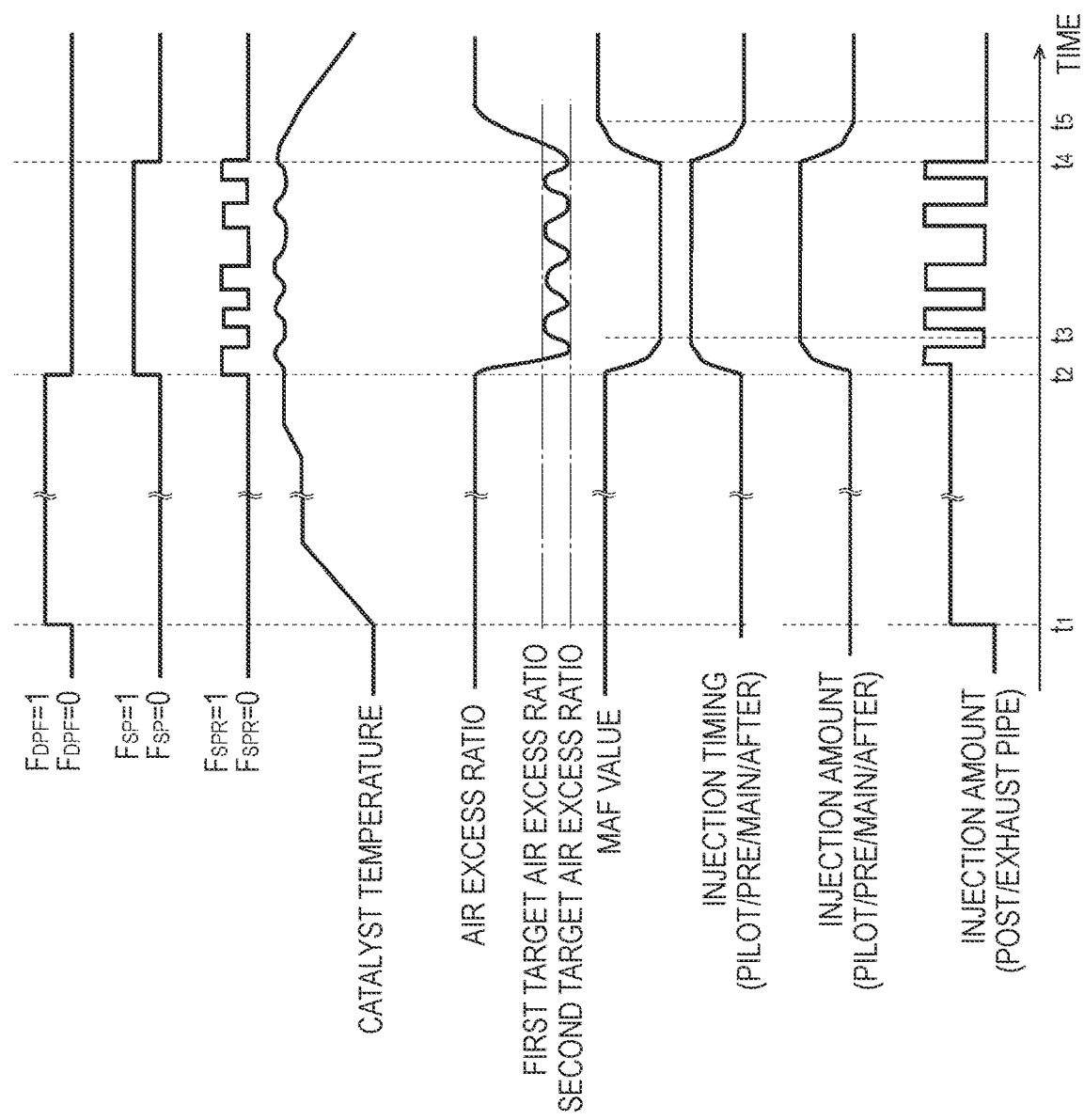

[FIG.3]
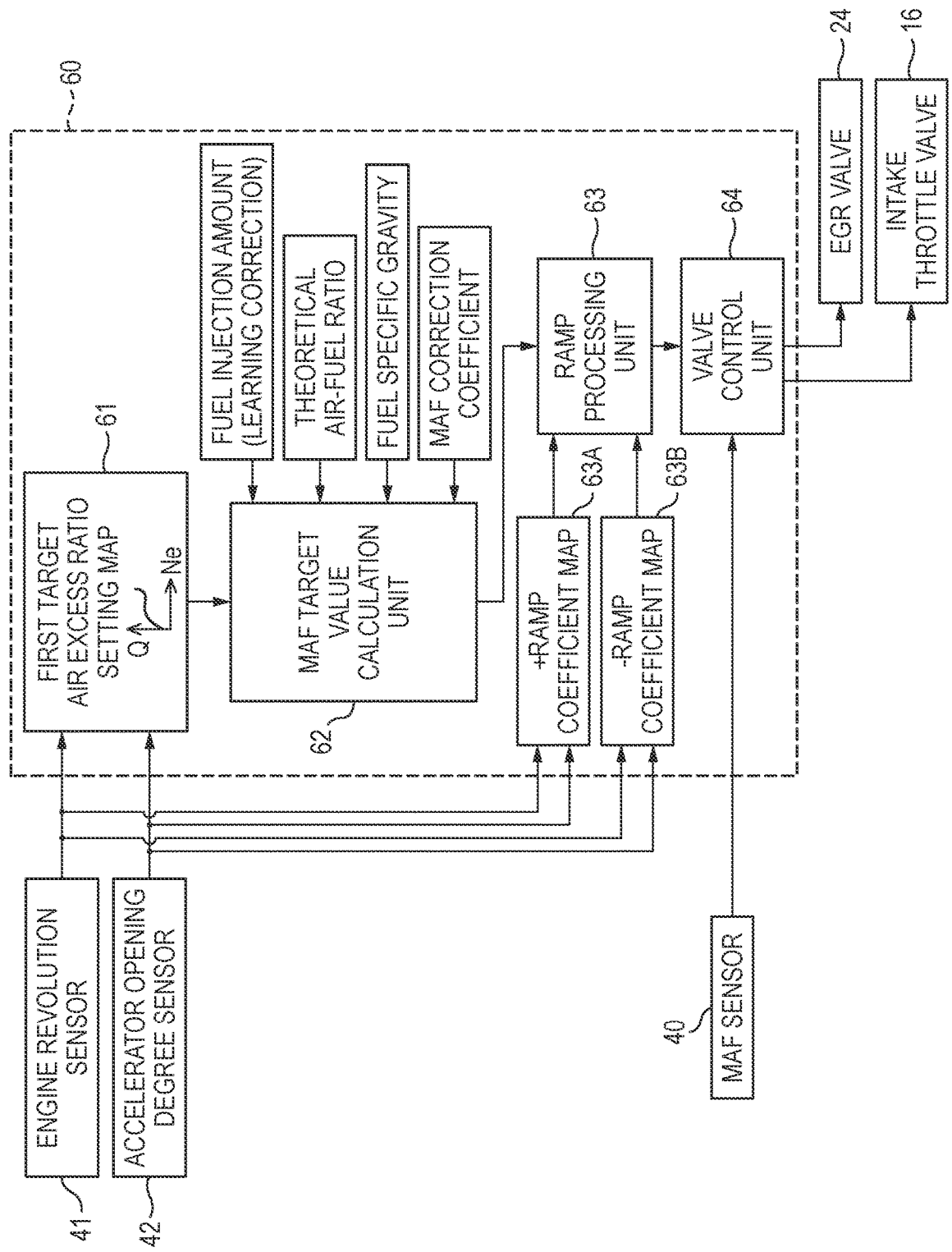

[FIG.4]
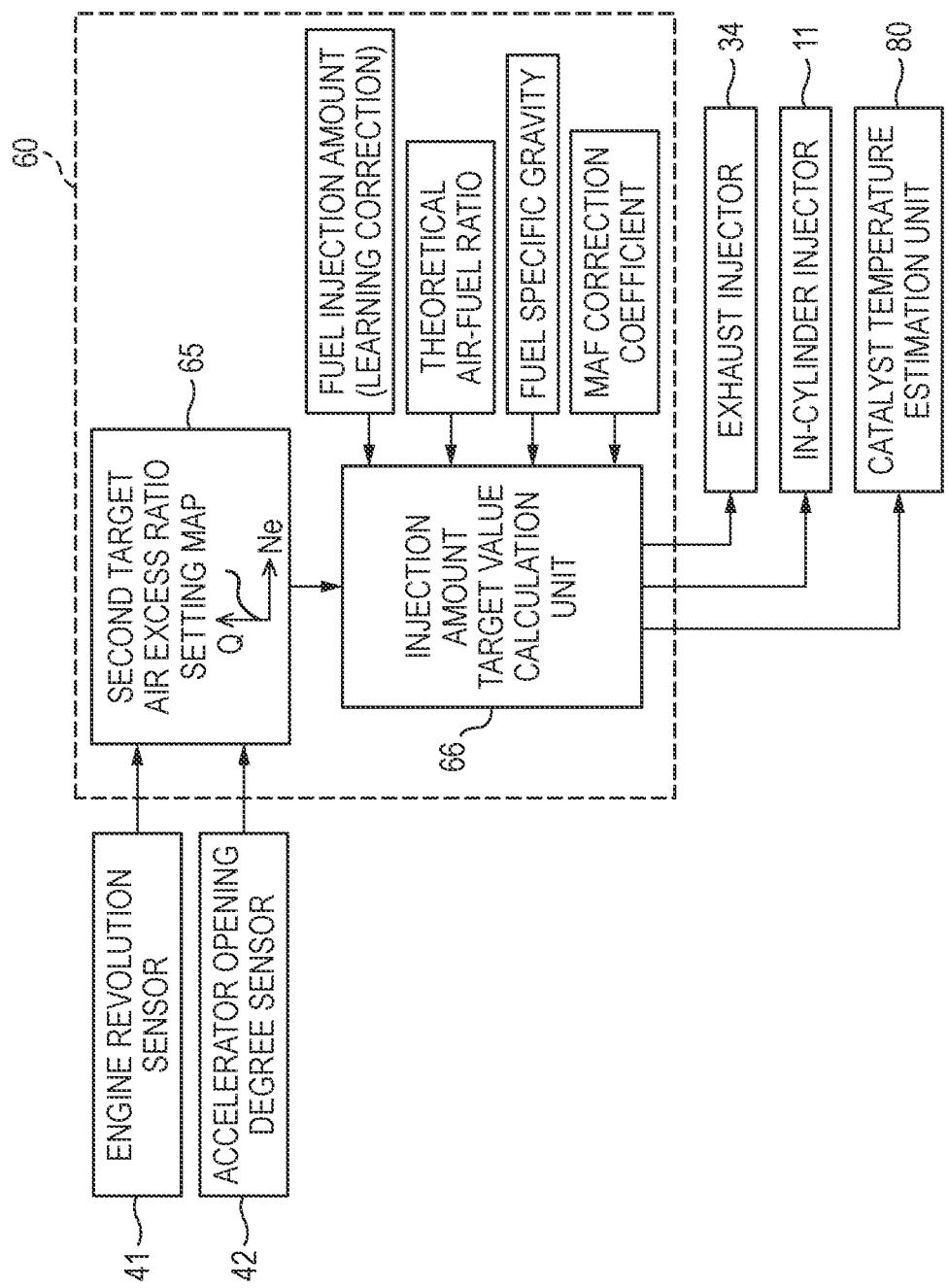

[FIG.5]
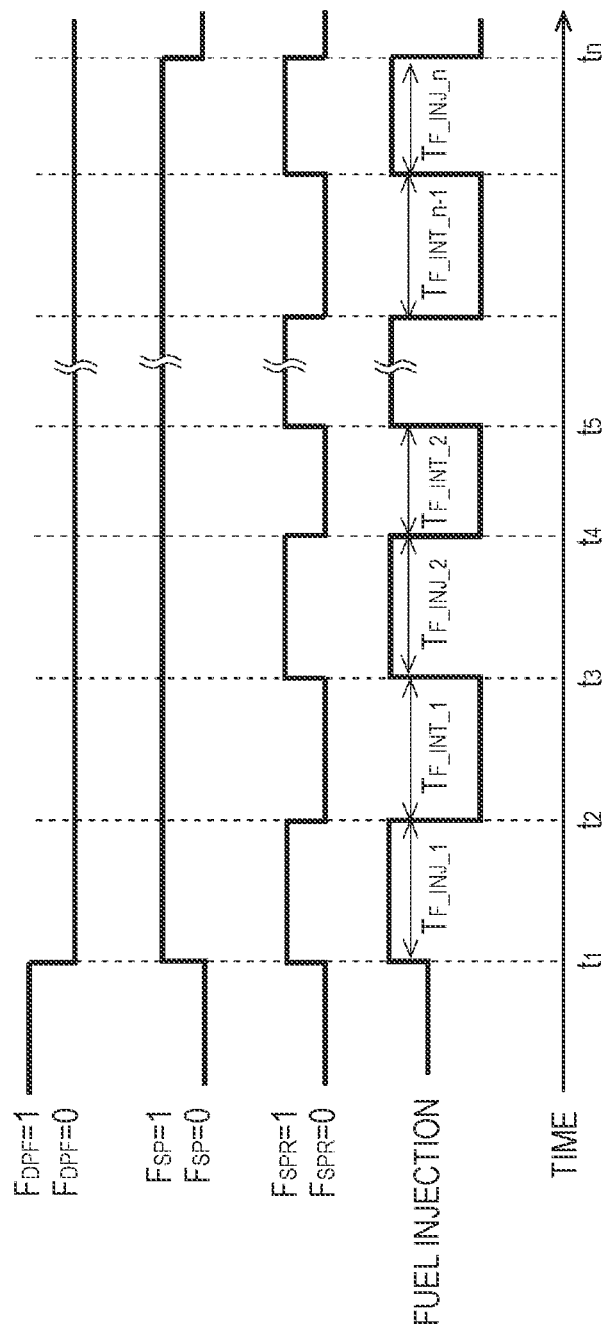

[FIG.6]
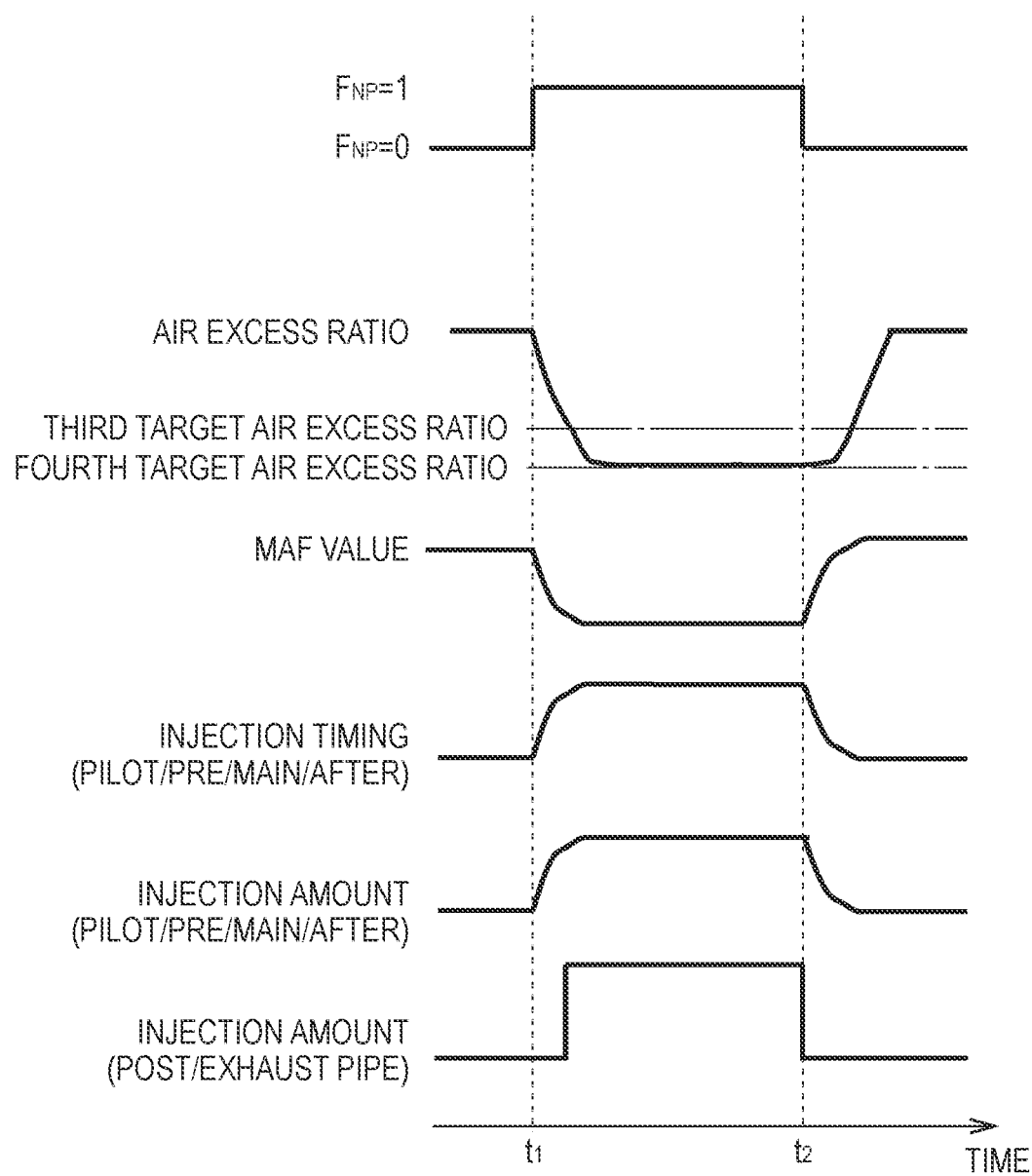

[FIG.7]
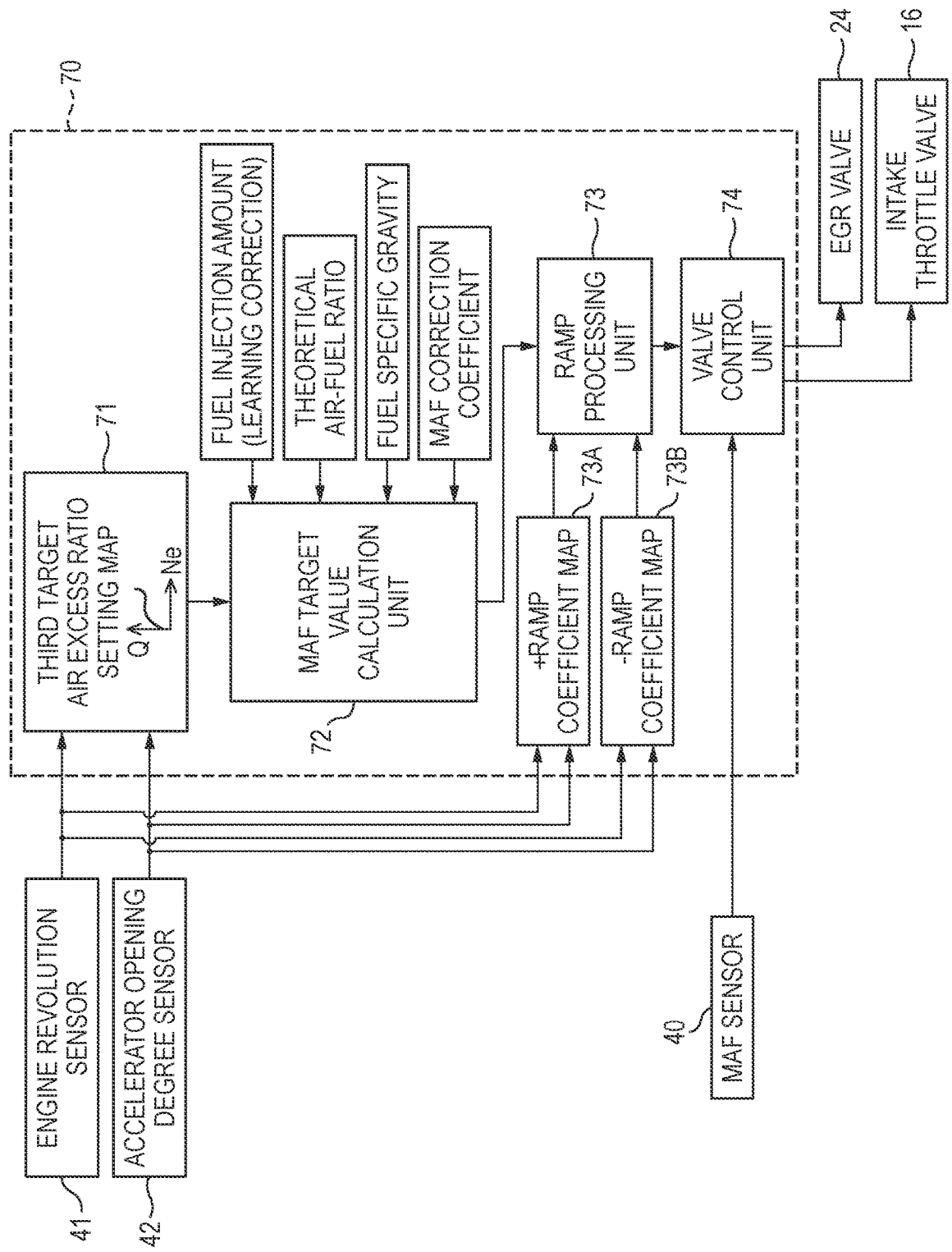

[FIG.8]
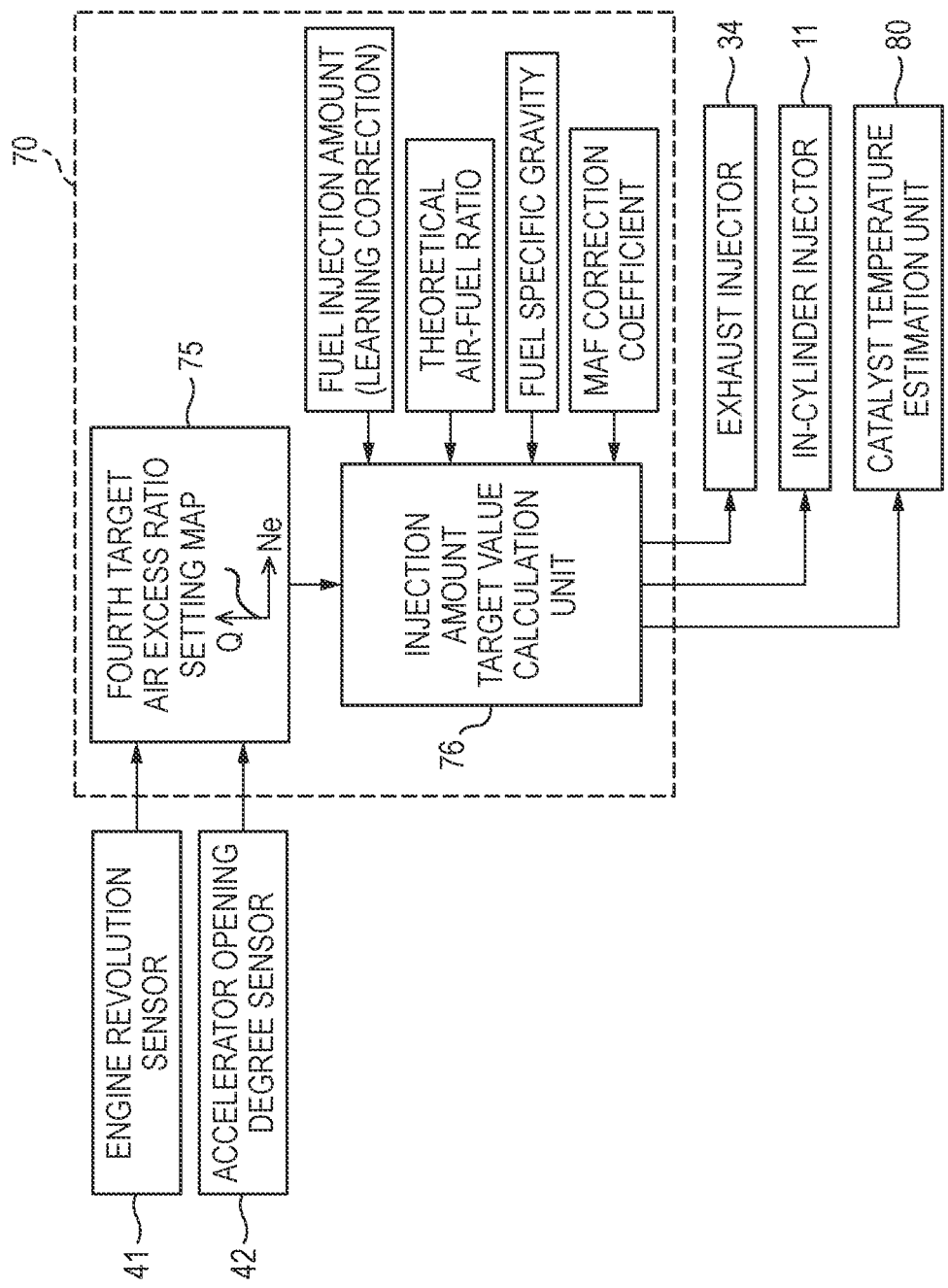

[FIG.9A]
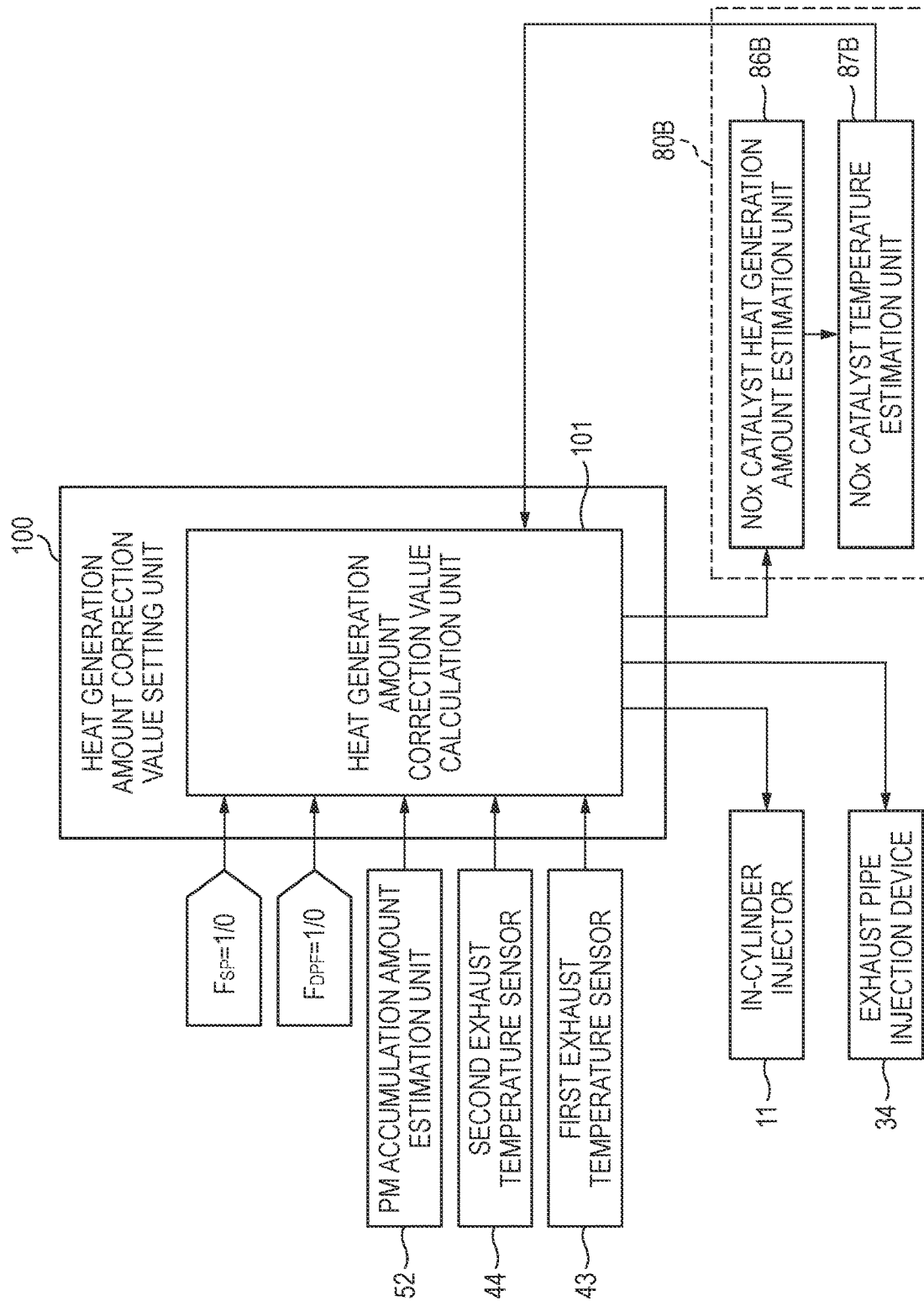

[FIG.9B]
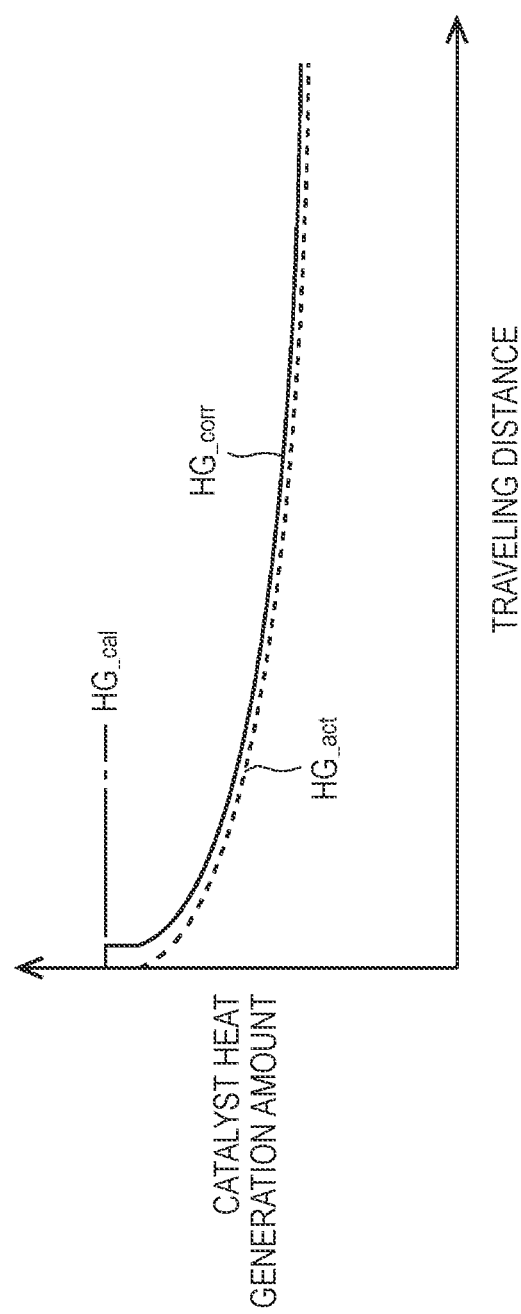

[FIG.10]
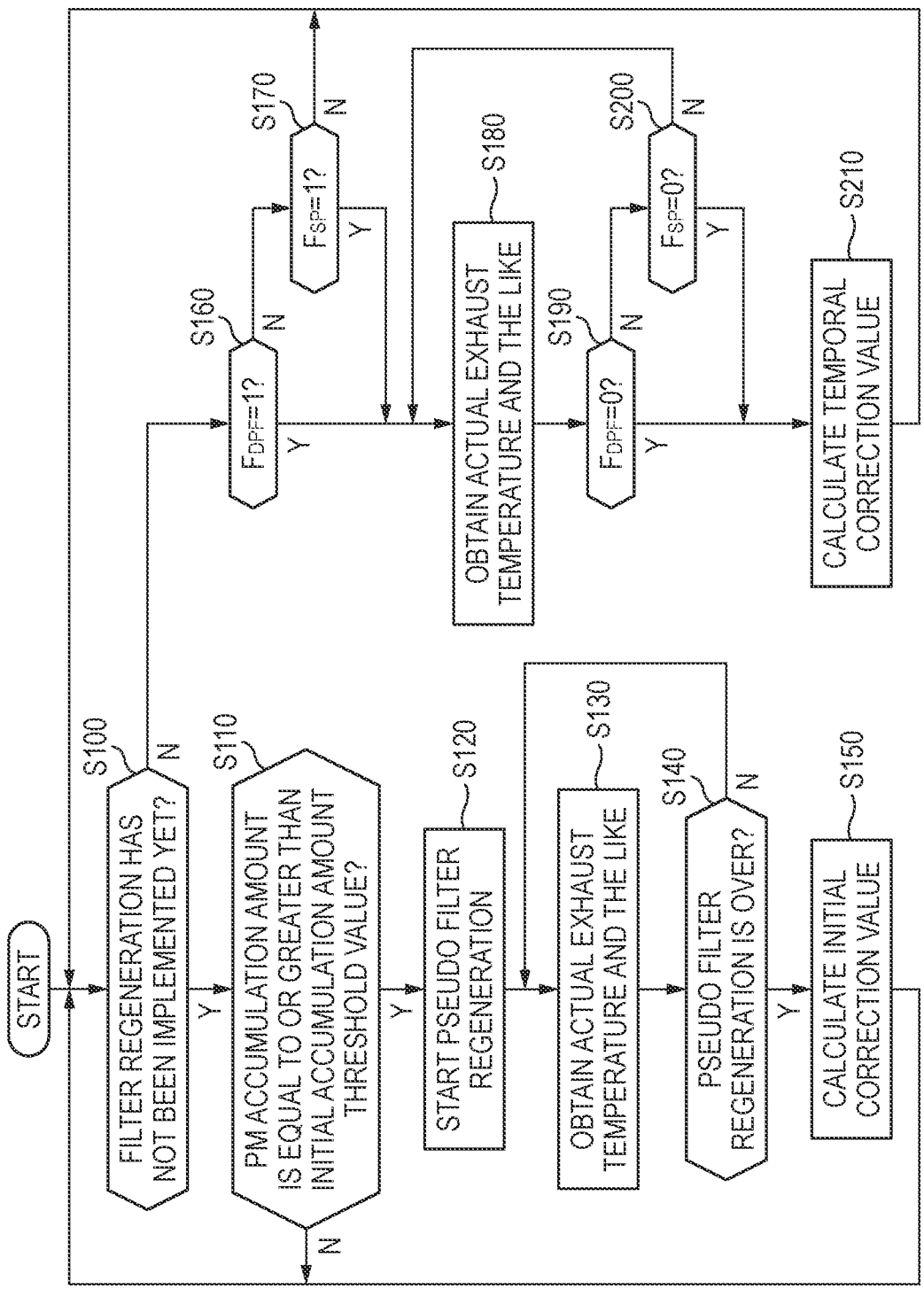

[FIG.11]
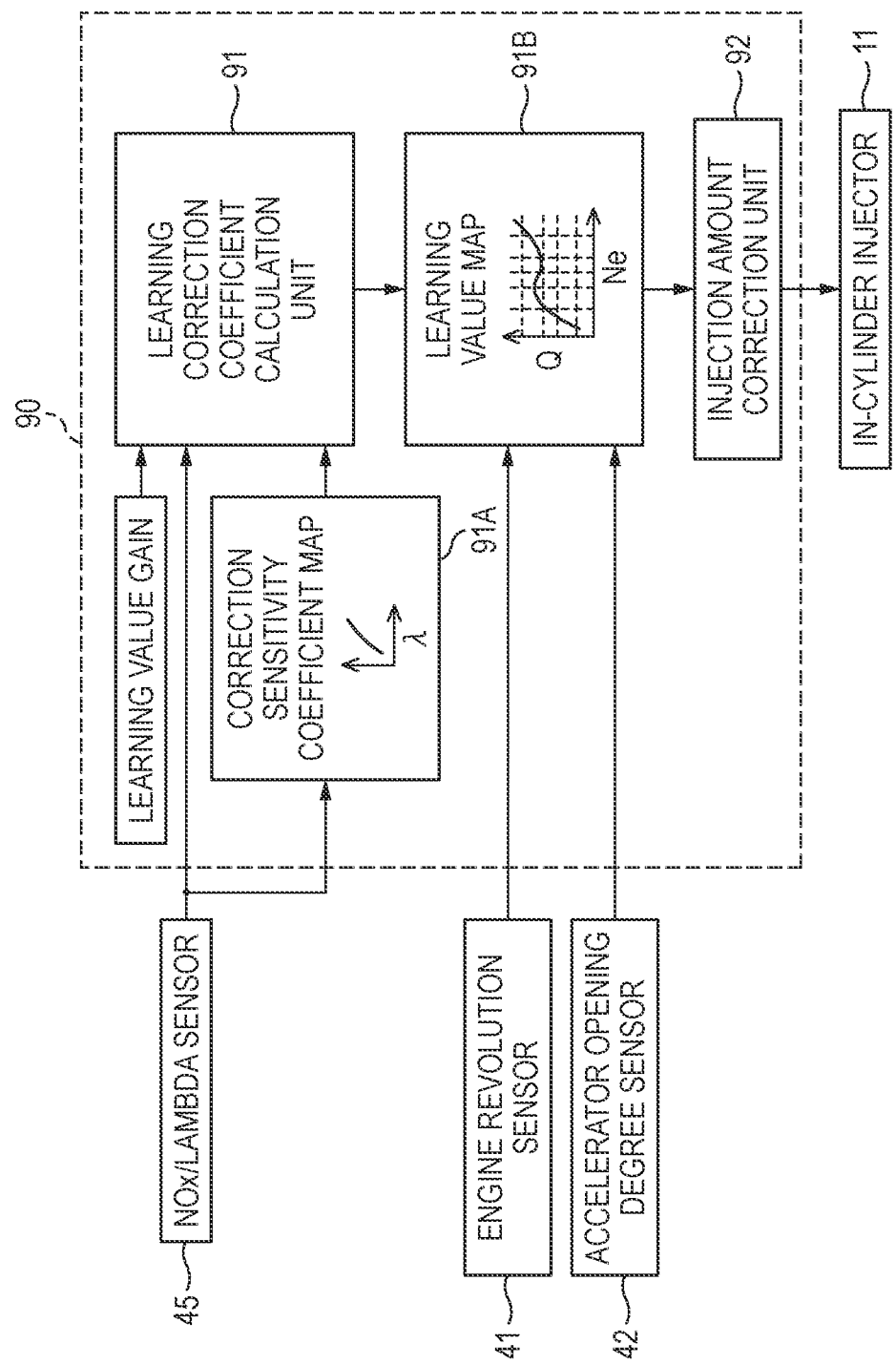

[FIG.12]
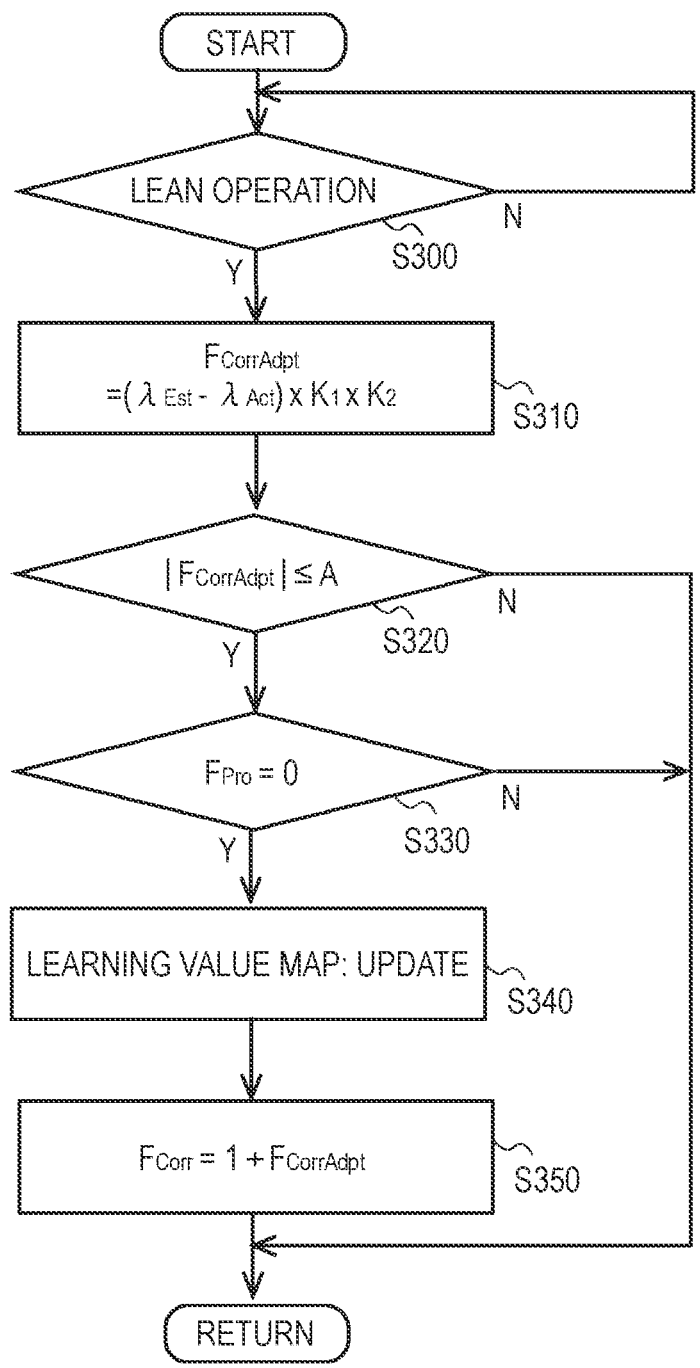

[FIG.13]
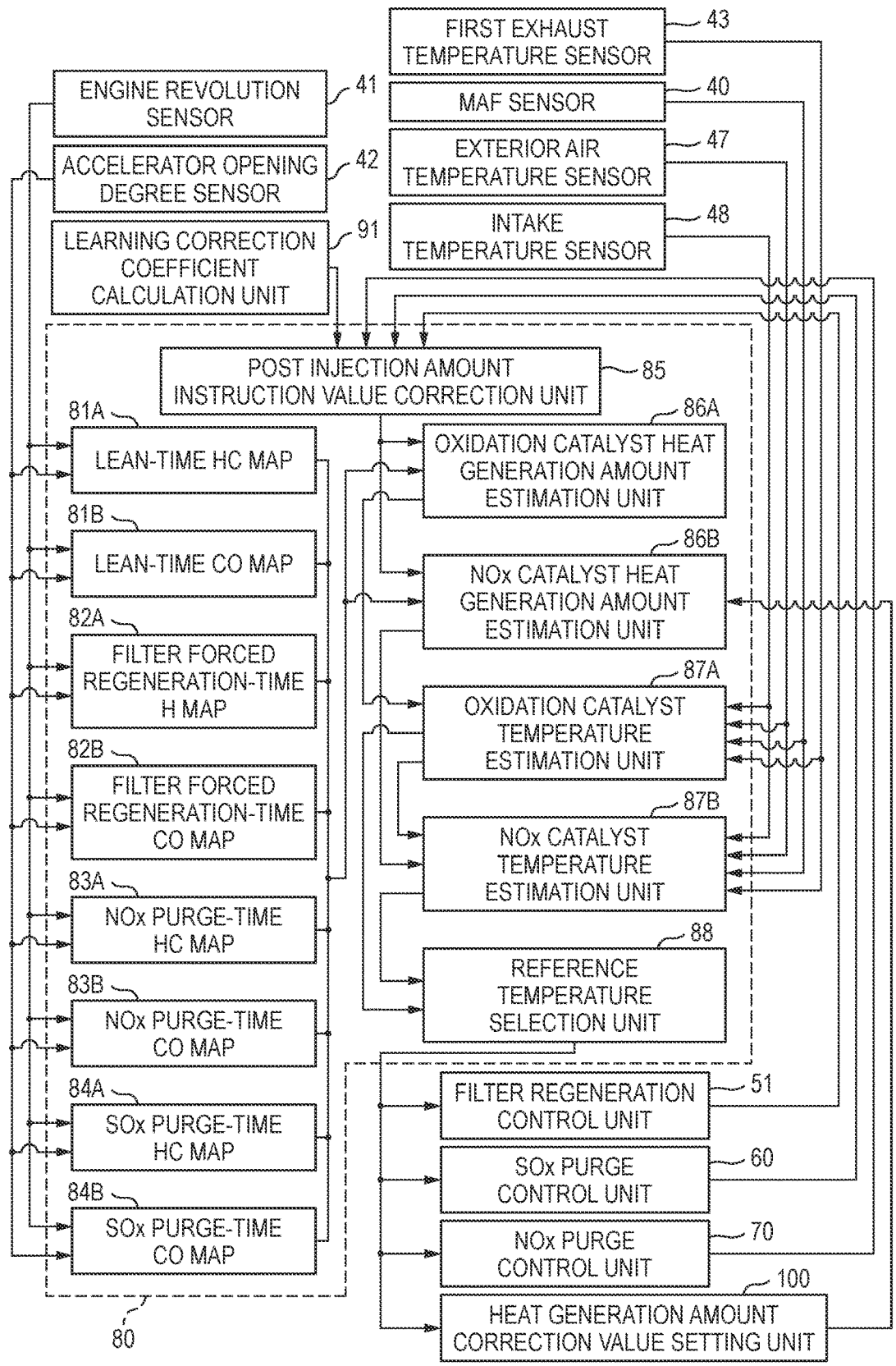

[FIG.14]
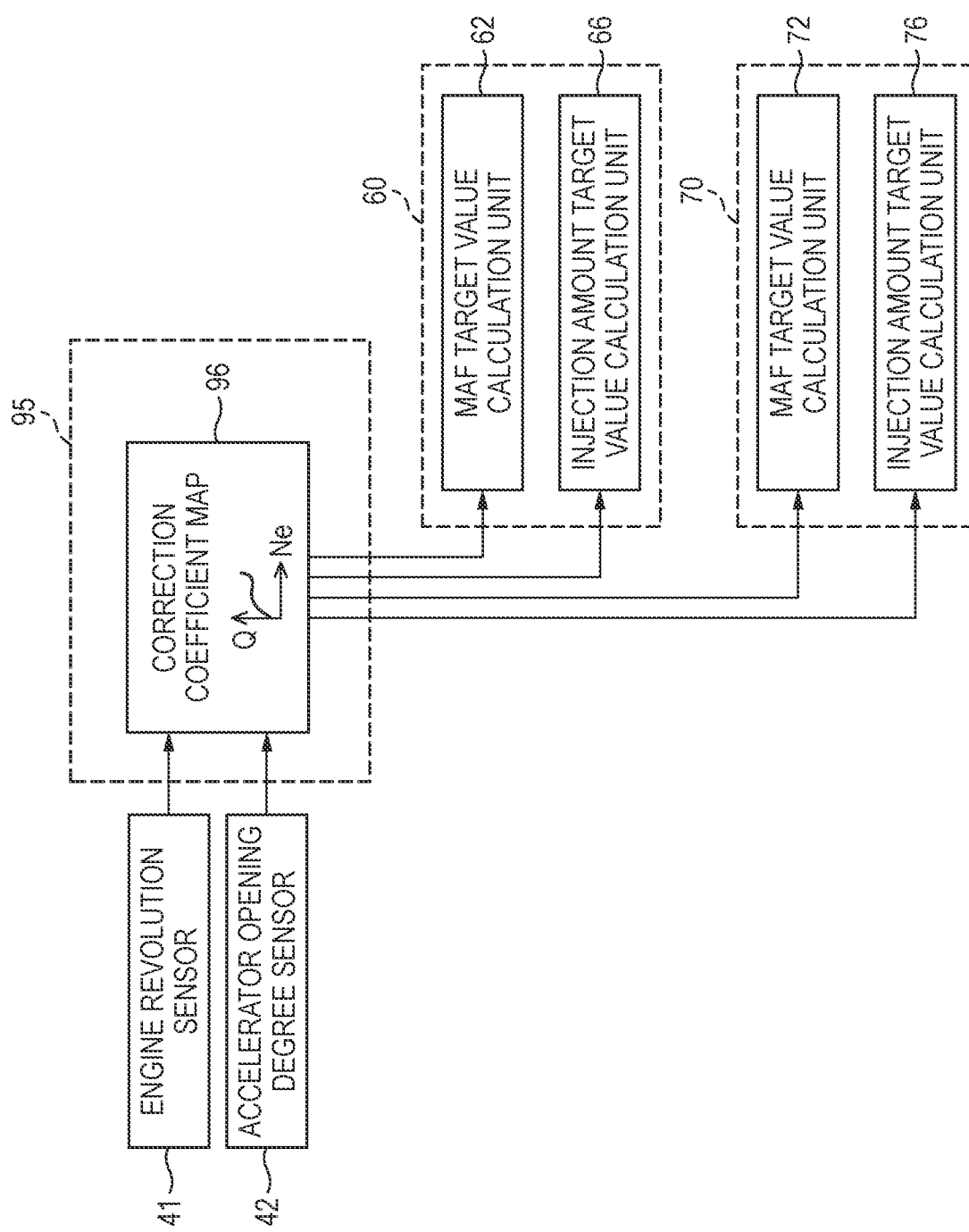

EXHAUST PURIFICATION DEVICE AND CONTROL METHOD FOR SAME

CROSS-REFERENCE TO RELATED APPLICATIONS

This application is a U.S. National Stage entry of PCT Application No. PCT/JP2016/059123, filed on Mar. 23, 2016, which claims priority to Japanese Patent Application No. 2015-062527, filed Mar. 25, 2015, the contents of which are incorporated herein by reference.

TECHNICAL FIELD

The present invention relates to an exhaust purification device and a control method thereof.

BACKGROUND ART

In the related art, a NOx-occlusion-reduction-type catalyst has been known, as catalyst for reducing and purifying nitrogen compound (NOx) in the exhaust to be emitted from an internal combustion engine. When the exhaust is in a lean atmosphere, the NOx-occlusion-reduction-type catalyst occludes NOx contained in the exhaust, and when the exhaust is in a rich atmosphere, the NOx-occlusion-reduction-type catalyst detoxifies and releases the occluded NOx with hydrocarbon contained in the exhaust by reduction and purification. For this reason, when a NOx occlusion amount of the catalyst reaches a predetermined amount, it is necessary to periodically perform NOx purge of enriching the exhaust by post injection or exhaust pipe injection so as to recover a NOx occlusion capacity (for example, refer to PTL 1).

Also, sulfur oxide (SOx) contained in the exhaust is occluded in the NOx-occlusion-reduction-type catalyst. When a SOx occlusion amount increases, a NOx purification capacity of the NOx-occlusion-reduction-type catalyst is deteriorated. For this reason, when the SOx occlusion amount reaches a predetermined amount (sulfur poisoning), it is necessary to periodically perform SOx purge of supplying unburnt fuel to an upstream oxidation catalyst to increase an exhaust temperature to a SOx separation temperature by post injection or exhaust pipe injection so as to separate SOx from the NOx-occlusion-reduction-type catalyst for recovery from the sulfur poisoning (for example, refer to PTL 2).

CITATION LIST

Patent Documents

PTL 1: JP2008-202425A
PTL 2: JP2009-047086A

SUMMARY OF INVENTION

Technical Problem

In general, in the above type of the device, when performing the NOx purge or SOx purge, an amount of the unburnt fuel corresponding to a deviation between an estimated temperature and a target temperature of the NOx-occlusion-reduction-type catalyst is supplied. When estimating a catalyst temperature, a heat generation amount of the catalyst is used. However, there is an individual difference in the heat generation amount of the catalyst. Also, the heat generation amount of the catalyst gradually decreases due to aging degradation. In order to secure estimation accuracy of the catalyst temperature, it is required to obtain the heat generation amount of the catalyst as correct as possible.

An exhaust purification device and a control method thereof of the disclosure are to improve estimation accuracy of a catalyst temperature.

Solution to Problem

An exhaust purification device of the disclosure includes a catalyst provided in an exhaust system of an internal combustion engine and configured to generate heat and to purify an exhaust by unburnt fuel in the exhaust, a catalyst regeneration means for implementing catalyst regeneration processing of recovering a purification capacity of the catalyst by maintaining a temperature of the catalyst at a predetermined recovery temperature, a catalyst temperature estimation means for estimating a temperature of the catalyst on the basis of an amount of the unburnt fuel contained in the exhaust and a heat generation amount of the catalyst, an exhaust temperature detection means that is arranged at a further exhaust downstream side than the catalyst and detects an exhaust temperature emitted from the catalyst, and a correction value obtaining means for, during implementation of the catalyst regeneration processing by the catalyst regeneration means, obtaining a heat generation amount correction value, which is used to correct the heat generation amount of the catalyst, on the basis of an estimated catalyst temperature estimated by the catalyst temperature estimation means and an actual exhaust temperature detected by the exhaust temperature detection means.

Also, an exhaust purification device of the disclosure is an exhaust purification device including a catalyst provided in an exhaust system of an internal combustion engine and configured to generate heat and to purify an exhaust by unburnt fuel in the exhaust, an exhaust temperature detection sensor arranged at a further exhaust downstream side than the catalyst and configured to detect an exhaust temperature emitted from the catalyst, and a control unit, wherein the control unit is configured to execute:

catalyst regeneration processing of recovering a purification capacity of the catalyst by maintaining a temperature of the catalyst at a predetermined recovery temperature, catalyst temperature estimation processing of estimating the temperature of the catalyst on the basis of an amount of the unburnt fuel contained in the exhaust and a heat generation amount of the catalyst, and correction value obtaining processing of, during implementation of the catalyst regeneration processing, obtaining a heat generation amount correction value, which is used to correct the heat generation amount of the catalyst, on the basis of an estimated catalyst temperature estimated by the catalyst temperature estimation processing and an actual exhaust temperature detected by the exhaust temperature detection sensor.

Also, a control method of an exhaust purification device of the disclosure is a control method of an exhaust purification device including a catalyst provided in an exhaust system of an internal combustion engine and configured to generate heat and to purify the exhaust by unburnt fuel in exhaust and an exhaust temperature detection sensor arranged at a further exhaust downstream side than the catalyst and configured to detect an exhaust temperature emitted from the catalyst. The method includes:

catalyst regeneration processing of recovering a purification capacity of the catalyst by maintaining a temperature of the catalyst at a predetermined recovery temperature, catalyst temperature estimation processing of estimating the temperature of the catalyst on the basis of an amount of the unburnt fuel contained in the exhaust and a heat generation amount of the catalyst, exhaust temperature detection processing of detecting an exhaust temperature emitted from the catalyst at a further downstream side than the catalyst, and correction value obtaining processing of, during implementation of the catalyst regeneration processing, obtaining a heat generation amount correction value, which is used to correct the heat generation amount of the catalyst, on the basis of an estimated catalyst temperature estimated by the catalyst temperature estimation processing and an actual exhaust temperature detected by the exhaust temperature detection sensor.

Advantageous Effects of Invention

According to the exhaust purification device and the control method thereof of the disclosure, it is possible to improve the estimation accuracy of the catalyst temperature.

BRIEF DESCRIPTION OF DRAWINGS

FIG. 1 is an overall configuration view depicting an exhaust purification system in accordance with an illustrative embodiment.

FIG. 2 is a timing chart diagram for illustrating SOx purge control in accordance with the illustrative embodiment.

FIG. 3 is a block diagram depicting setting processing of an MAF target value upon SOx purge lean control in accordance with the illustrative embodiment.

FIG. 4 is a block diagram depicting setting processing of a target injection amount upon SOx purge rich control in accordance with the illustrative embodiment.

FIG. 5 is a timing chart diagram for illustrating catalyst temperature regulation control of SOx purge control in accordance with the illustrative embodiment.

FIG. 6 is a timing chart diagram for illustrating NOx purge control in accordance with the illustrative embodiment.

FIG. 7 is a block diagram depicting setting processing of an MAF target value upon NOx purge lean control in accordance with the illustrative embodiment.

FIG. 8 is a block diagram depicting setting processing of a target injection amount upon NOx purge rich control in accordance with the illustrative embodiment.

FIG. 9A is a block diagram depicting setting processing of a heat generation amount correction value in accordance with the illustrative embodiment.

FIG. 9B illustrates temporal change of a catalyst heat generation amount and an estimated heat generation amount after correction.

FIG. 10 is a flowchart depicting setting processing of the heat generation amount correction value in accordance with the illustrative embodiment.

FIG. 11 is a block diagram depicting injection amount learning correction processing of an injector in accordance with the illustrative embodiment.

FIG. 12 is a flowchart depicting learning correction coefficient calculation processing in accordance with the illustrative embodiment.

FIG. 13 is a block diagram depicting catalyst temperature estimation processing in accordance with the illustrative embodiment.

FIG. 14 is a block diagram depicting setting processing of an MAF correction coefficient in accordance with the embodiment.

DESCRIPTION OF EMBODIMENTS

Hereinafter, an exhaust purification system in accordance with an illustrative embodiment of the disclosure will be described with reference to the accompanying drawings. As shown in FIG. 1, each cylinder of a Diesel engine (hereinafter, simply referred to as 'engine') 10 is provided with an in-cylinder injector 11 configured to directly inject high-pressure fuel accumulated to a common rail (not shown) into each cylinder. A fuel injection amount and fuel injection timing of each in-cylinder injector 11 are controlled in correspondence to instruction signals that are input from an electronic control unit (hereinafter, referred to as 'ECU') 50.

An intake manifold 10A of the engine 10 is connected with an intake passage 12 for introducing therein fresh air, and an exhaust manifold 10B is connected with an exhaust passage 13 for discharging exhaust to an outside. The intake passage 12 is provided with an air cleaner 14, an intake air amount sensor (hereinafter, referred to as 'MAF sensor') 40, an intake temperature sensor 48, a compressor 20A of a variable capacity-type supercharger 20, an intercooler 15, an intake throttle valve 16 and the like, in corresponding order from an intake upstream side. The exhaust passage 13 is provided with a turbine 20B of the variable capacity-type supercharger 20, an exhaust after-treatment device 30 and the like, in corresponding order from an exhaust upstream side. In the meantime, the engine 10 is mounted with an engine revolution sensor 41, an accelerator opening degree sensor 42, a boost pressure sensor 46 and an exterior air temperature sensor 47.

In the description of the illustrative embodiment, the MAF sensor 40 configured to measure and detect a mass flow rate (Mass Air Flow) is used as the sensor configured to measure and detect an intake air amount (intake flow rate (Suction Air Flow)) of the engine. However, a flow rate (air flow) sensor different from the MAF sensor 40 or a means replacing the flow rate sensor can also be used inasmuch as it can measure and detect the intake flow rate of the engine.

An EGR (Exhaust Gas Recirculation) device 21 includes an EGR passage 22 configured to connect the exhaust manifold 10B and the intake manifold 10A each other, an EGR cooler 23 configured to cools an EGR gas, and an EGR valve 24 configured to regulate an EGR amount.

The exhaust after-treatment device 30 includes an oxidation catalyst 31, a NOx-occlusion-reduction-type catalyst 32 and a particulate filter (hereinafter, simply referred to as 'filter') 33, which are arranged in a case 30A in corresponding order from the exhaust upstream side. Also, the exhaust passage 13 positioned further upstream than the oxidation catalyst 31 is provided with an exhaust injector 34 configured to inject unburnt fuel (mainly, hydrocarbon (HC)) into the exhaust passage 13, in response to an instruction signal input from the ECU 50.

The oxidation catalyst 31 is formed by carrying an oxidation catalyst component on a surface of a ceramic carrier such as a honeycomb structure, for example. When the unburnt fuel is supplied by post injection of the exhaust injector 34 or the in-cylinder injector 11, the oxidation catalyst 31 oxidizes the same to increase an exhaust temperature.

The NOx-occlusion-reduction-type catalyst 32 is formed by carrying alkali metal or the like on a surface of a ceramic carrier such as a honeycomb structure, for example. The NOx-occlusion-reduction-type catalyst 32 occludes NOx in the exhaust when the exhaust air-fuel ratio is in a lean state, and reduces and purifies the occluded NOx with a reducing agent (HC or the like) included in the exhaust when the exhaust air-fuel ratio is in a rich state.

The filter 33 is formed by arranging a plurality of cells, which are divided by a porous partition wall, along a flowing direction of the exhaust and alternately plugging upstream and downstream sides of the cells, for example. The filter 33 is configured to trap particulate matters (PM) in the exhaust in fine holes or surfaces of the partition wall, and when an estimated PM accumulation amount reaches a predetermined amount, so-called filter forced regeneration of combusting and removing the accumulated PM is executed. The filter forced regeneration is performed by supplying the unburnt fuel to the upstream oxidation catalyst 31 by the exhaust pipe injection or the post injection and increasing a temperature of the exhaust to be introduced to the filter 33 to a PM combustion temperature.

A first exhaust temperature sensor 43 is provided further upstream than the oxidation catalyst 31 and is configured to detect a temperature of the exhaust to be introduced into the oxidation catalyst 31. A second exhaust temperature sensor 44 is an example of the exhaust temperature detection means of the disclosure and is provided at a further exhaust downstream side than the NOx-occlusion-reduction-type catalyst 32 and at a further exhaust upstream side than the filter 33. The second exhaust temperature sensor 44 is configured to detect a temperature of the exhaust to be introduced into the filter 33 immediately after emitted from the NOx-occlusion-reduction-type catalyst 32. In the illustrative embodiment, since the NOx-occlusion-reduction-type catalyst 32 and the filter 33 are arranged closely to each other, the exhaust temperature that is to be detected by the second exhaust temperature sensor 44 is substantially the same as a temperature of the NOx-occlusion-reduction-type catalyst 32.

A NOx/lambda sensor 45 is provided further downstream than the filter 33, and is configured to detect a NOx value and a lambda value (hereinafter, referred to as 'air excess ratio') of the exhaust having passed through the NOx-occlusion-reduction-type catalyst 32.

A differential pressure sensor 49 is a sensor configured to detect a differential pressure between an upstream side and a downstream side of the filter 33. A detection signal of the differential pressure sensor 49 is output to the ECU 50. The differential pressure sensor 49 and a PM accumulation amount estimation unit 52 (which will be described later) of the ECU 50 are examples of the accumulation amount estimation means.

The ECU 50 is configured to perform a variety of controls of the engine 10 and the like and includes a CPU, a ROM, a RAM, an input port, an output port and the like, which are well known. In order to perform the diverse controls, the ECU 50 is input with sensor values of the sensors 40 to 45. Also, the ECU 50 has, as some functional elements, a filter regeneration control unit 51, a PM accumulation amount estimation unit 52, a SOx purge control unit 60, a NOx purge control unit 70, a heat generation amount correction value setting unit 100, an MAF follow-up control unit 98, an injection amount learning correction unit 90, a catalyst temperature estimation unit 80 and an MAF correction coefficient calculation unit 95. The functional elements are included in the ECU 50, which is the integral hardware. However, some of the functional elements may be provided in separate hardware.

[Filter Regeneration Control]

The filter regeneration control unit 51 is an example of the filter regeneration means of the disclosure and is configured to implement filter regeneration processing of combusting and removing PM accumulated in the filter 33. The filter regeneration control unit 51 sets a filter forced regeneration flag $F_{DPF}$ to an on-state (refer to time $t_1$ in FIG. 2) when an estimated PM accumulation amount obtained from the PM accumulation amount estimation unit 52 exceeds a predetermined upper limit threshold value. When the filter forced regeneration flag $F_{DPF}$ becomes on, an instruction signal for executing exhaust pipe injection is transmitted to the exhaust injector 34 or an instruction signal for executing post injection is transmitted to each in-cylinder injector 11. Thereby, the exhaust temperature is increased to a PM combustion temperature (for example, about 550° C.), and the temperature-increased state is maintained. The filter forced regeneration flag $F_{DPF}$ becomes off (refer to time $t_2$ in FIG. 2) when the estimated PM accumulation amount is lowered to a predetermined lower limit threshold value (determination threshold value) indicative of combustion removal. An injection amount instruction value (hereinafter, referred to as 'filter regeneration post injection amount instruction value $Q_{DPF\_Post\_Trgt}$'), which is used when the filter forced regeneration is implemented by the post injection, is transmitted to the catalyst temperature estimation unit 80, too, which will be described in detail later, so as to estimate a catalyst heat generation amount.

[PM Accumulation Amount Estimation]

The PM accumulation amount estimation unit (an example of the filter accumulation amount estimation means) 52 is configured to estimate a PM accumulation amount trapped in the filter 33. The PM accumulation amount estimation unit 52 has a differential pressure characteristic map (not shown), which is obtained in advance by a test and the like and indicates a relation between a front-rear differential pressure of the filter 33 and a PM accumulation amount. The PM accumulation amount estimation unit is configured to calculate and estimate a PM accumulation amount trapped in the filter 33 on the basis of the differential pressure characteristic map and a level of a detection signal of the differential pressure sensor 49. In the meantime, the estimation of the PM accumulation amount in the filter 33 is not limited to the differential pressure sensor 49, and the other method can also be adopted. For example, the PM accumulation amount may be estimated on the basis of a traveling distance of a vehicle and may be detected by an electrostatic capacitance-type or resistance-type PM sensor.

[SOx Purge Control]

The SOx purge control unit 60 is an example of the catalyst regeneration means of the disclosure and is configured to implement catalyst regeneration processing of enriching the exhaust, increasing the exhaust temperature to a sulfur separation temperature (for example, about 600° C.), maintaining the sulfur separation temperature for a predetermined time period and recovering the NOx-occlusion-reduction-type catalyst 32 from the SOx poisoning (sulfur poisoning) (hereinafter, the control for implementing the catalyst regeneration processing is referred to as 'SOx purge control').

FIG. 2 is a timing chart of the SOx purge control in accordance with the illustrative embodiment. As shown in FIG. 2, a SOx purge flag $F_{SP}$ for starting the SOx purge control becomes on at the same time when the filter forced regeneration flag $F_{DPF}$ becomes off (refer to time $t_2$ in FIG. 2). Thereby, the control can be effectively shifted to the SOx purge control from a state where the exhaust temperature has been increased by the forced regeneration of the filter 33, so that the fuel consumption can be effectively reduced.

In the illustrative embodiment, the enriching of the exhaust by the SOx purge control is implemented by concurrently using SOx purge lean control of lowering an air excess ratio from a value (for example, about 1.5) upon normal operation to a first target air excess ratio (for example, about 1.3) closer to a lean side than a theoretical air-fuel ratio equivalent value (about 1.0) by air system control and SOx purge rich control of lowering the air excess ratio from the first target air excess ratio to a second target air excess ratio (for example, about 0.9) of a rich side by injection system control. Hereinafter, the SOx purge lean control and the SOx purge rich control are described in detail.

[Air System Control of SOx Purge Lean Control]

FIG. 3 is a block diagram depicting setting processing of an MAF target value $MAF_{SPL\_Trgt}$ upon SOx purge lean control. A first target air excess ratio setting map 61 is a map that is to be referred to on the basis of an engine revolution Ne and an accelerator opening degree Q (a fuel injection amount of the engine 10), and an air excess ratio target value $\lambda_{SPL\_Trgt}$ (first target air excess ratio) upon SOx purge lean control corresponding to the engine revolution Ne and the accelerator opening degree Q is set in advance by a test and the like.

First, the air excess ratio target value $\lambda_{SPL\_Trgt}$ upon SOx purge lean control is read from the first target air excess ratio setting map 61, in response to the engine revolution Ne and the accelerator opening degree Q, which are input signals, and is then input to an MAF target value calculation unit 62. Also, the MAF target value calculation unit 62 calculates an MAF target value $MAF_{SPL\_Trgt}$ upon SOx purge lean control, based on an equation (1).

$$MAF_{SPL\_Trgt} = \lambda_{SPL\_Trgt} \times Q_{fnl\_corrd} \times Ro_{Fuel} \times AFR_{sto} / Maf_{corr} \quad (1)$$

In the equation (1), $Q_{fnl\_corrd}$ indicates a learning-corrected fuel injection amount (the post injection is excluded) (which will be described later), $Ro_{Fuel}$ indicates a fuel specific gravity, $AFR_{sto}$ indicates a theoretical air-fuel ratio, and $Maf_{corr}$ indicates an MAF correction coefficient (which will be described later).

The MAF target value $MAF_{SPL\_Trgt}$ calculated by the MAF target value calculation unit 62 is input to a ramp processing unit 63 when the SOx purge flag $F_{SP}$ becomes on (refer to time $t_2$ in FIG. 2). The ramp processing unit 63 is configured to read a ramp coefficient from each of ramp coefficient maps 63A, 63B, in response to the engine revolution Ne and the accelerator opening degree Q, which are input signals, and to input an MAF target ramp value $MAF_{SPL\_Trgt\_Ramp}$ to which the ramp coefficient is added to a valve control unit 64.

The valve control unit 64 is configured to execute feedback control of narrowing the intake throttle valve 16 towards a close side and widening the EGR valve 24 towards an open side so that an actual MAF value $MAF_{Act}$ input from the MAF sensor 40 becomes the MAF target ramp value $MAF_{SPL\_Trgt\_Ramp}$.

In this way, in the illustrative embodiment, the MAF target value $MAF_{SPL\_Trgt}$ is set on the basis of the air excess ratio target value $\lambda_{SPL\_Trgt}$, which is to be read from the first target air excess ratio setting map 61, and the fuel injection amount of each in-cylinder injector 11, and the air system operation is controlled in the feedback manner on the basis of the MAF target value $MAF_{SPL\_Trgt}$. Thereby, it is possible to effectively lower the exhaust to a desired air excess ratio necessary for the SOx purge lean control without providing a lambda sensor at the upstream side of the NOx-occlusion-reduction-type catalyst 32 or without using a sensor value of a lambda sensor even when the lambda sensor is provided at the upstream side of the NOx-occlusion-reduction-type catalyst 32.

Also, the fuel injection amount $Q_{fnl\_corrd}$ after the learning correction is used as the fuel injection amount of each in-cylinder injector 11, so that it is possible to set the MAF target value $MAF_{SPL\_Trgt}$ in the feed-forward control manner. Therefore, it is possible to effectively exclude influences such as aging degradation, characteristic change and individual difference of each in-cylinder injector 11.

Also, the ramp coefficient, which is to be set in correspondence to the operating state of the engine 10, is added to the MAF target value $MAF_{SPL\_Trgt}$, so that it is possible to effectively prevent accident fire of the engine 10 due to a rapid change in the intake air amount, deterioration of drivability due to torque variation, and the like.

[Setting of Fuel Injection Amount in SOx Purge Rich Control]

FIG. 4 is a block diagram depicting setting processing of a target injection amount $Q_{SPR\_Trgt}$ (injection amount per unit time) of the exhaust pipe injection or the post injection upon the SOx purge rich control. A second target air excess ratio setting map 65 is a map that is to be referred to on the basis of the engine revolution Ne and the accelerator opening degree Q, and an air excess ratio target value $\lambda_{SPR\_Trgt}$ (second target air excess ratio) upon SOx purge rich control corresponding to the engine revolution Ne and the accelerator opening degree Q is set in advance by a test and the like.

First, the air excess ratio target value $\lambda_{SPR\_Trgt}$ upon SOx purge rich control is read from the second target air excess ratio setting map 65, in response to the engine revolution Ne and the accelerator opening degree Q, which are input signals, and is then input to an injection amount target value calculation unit 66. Also, the injection amount target value calculation unit 66 calculates a target injection amount instruction value $Q_{SPR\_Trgt}$ upon SOx purge rich control, based on an equation (2).

$$Q_{SPR\_Trgt} = MAF_{SPL\_Trgt} \times Maf_{corr} / (\lambda_{SPR\_Trgt} \times Ro_{Fuel} \times AFR_{sto}) - Q_{fnl\_corrd} \quad (2)$$

In the equation (2), $MAF_{SPL\_Trgt}$ is input from the MAF target value calculation unit 62, as an MAF target value upon SOx purge lean. Also, $Q_{fnl\_corrd}$ indicates a learning-corrected fuel injection amount (the post injection is excluded) before an MAF follow-up control is applied (which will be described later), $Ro_{Fuel}$ indicates a fuel specific gravity, $AFR_{sto}$ indicates a theoretical air-fuel ratio, and $Maf_{corr}$ indicates an MAF correction coefficient (which will be described later).

The target injection amount instruction value $Q_{SPR\_Trgt}$ calculated by the injection amount target value calculation unit 66 is transmitted to the exhaust injector 34 or each in-cylinder injector 11, as an injection instruction signal, when a SOx purge flag $F_{SPR}$ (which will be described later) becomes on (hereinafter, an injection amount instruction value of the post injection to be transmitted to the in-cylinder injector 11 is referred to as 'SOx purge rich/post injection amount instruction value $Q_{SPR\_Post\_Trgt}$'). The SOx purge rich/post injection amount instruction value $Q_{SPR\_Post\_Trgt}$ is transmitted to the catalyst temperature estimation unit 80

(which will be described in detail later), too, so as to estimate a catalyst heat generation amount.

In this way, in the illustrative embodiment, the target injection amount instruction value $Q_{SPR\_Trgt}$ is set on the basis of the air excess ratio target value $\lambda_{SPR\_Trgt}$, which is to be read from the second target air excess ratio setting map 65, and the fuel injection amount of each in-cylinder injector 11. Thereby, it is possible to effectively lower the exhaust to a desired air excess ratio necessary for the SOx purge rich control without providing a lambda sensor at the upstream side of the NOx-occlusion-reduction-type catalyst 32 or without using a sensor value of a lambda sensor even when the lambda sensor is provided at the upstream side of the NOx-occlusion-reduction-type catalyst 32.

Also, the fuel injection amount $Q_{fnl\_corrd}$ after the learning correction is used as the fuel injection amount of each in-cylinder injector 11, so that it is possible to set the target injection amount instruction value $Q_{SPR\_Trgt}$ in the feed-forward control manner. Therefore, it is possible to effectively exclude influences such as aging degradation and characteristic change of each in-cylinder injector 11.

[Catalyst Temperature Regulation Control in SOx Purge Control]

The exhaust temperature (hereinafter, also referred to as 'catalyst temperature') to be introduced into the NOx-occlusion-reduction-type catalyst 32 during the SOx purge control is controlled by alternately switching on/off states (rich/lean) of a SOx purge rich flag $F_{SPR}$ for executing the exhaust pipe injection or the post injection, as shown at time $t_2$ to $t_4$ in FIG. 2. When the SOx purge rich flag $F_{SPR}$ becomes on ($F_{SPR}=1$), the catalyst temperature is increased by the exhaust pipe injection or the post injection (hereinafter, the corresponding time period is referred to as 'injection time period $T_{F\_INJ}$'). On the other hand, when the SOx purge rich flag $F_{SPR}$ becomes off, the catalyst temperature is decreased by stop of the exhaust pipe injection or the post injection (hereinafter, the corresponding time period is referred to as 'interval $T_{F\_INT}$').

In the illustrative embodiment, the injection time period $T_{F\_INJ}$ is set by reading a value corresponding to the engine revolution Ne and the accelerator opening degree Q from an injection time period setting map (not shown) prepared in advance by a test and the like. In the injection time period setting map, an injection time period, which is required to securely lower the air excess ratio of the exhaust obtained in advance by a test and the like to the second target air excess ratio, is set in correspondence to the operating state of the engine 10.

The interval $T_{F\_INT}$ is set by feedback control when the SOx purge rich flag $F_{SPR}$ is switched from the on-state, at which the catalyst temperature is highest, to the off-state. Specifically, the interval is processed by PID control consisting of proportional control of changing an input signal in proportion to a deviation $\Delta T$ between a catalyst target temperature when the SOx purge rich flag $F_{SPR}$ becomes off and an estimated catalyst temperature, integral control of changing an input signal in proportion to a time integral value of the deviation $\Delta T$ and derivative control of changing an input signal in proportion to a time derivative value of the deviation $\Delta T$. The catalyst target temperature is set to a temperature at which SOx can be separated from the NOx-occlusion-reduction-type catalyst 32, and the estimated catalyst temperature is set by any one of an oxidation catalyst temperature, which is appropriately selected by a reference temperature selection unit 88 (refer to FIG. 13) (which will be described in detail later)), and a NOx catalyst temperature.

As shown at time $t_1$ in FIG. 5, when the SOx purge flag $F_{SP}$ becomes on as the filter forced regeneration is ended ($F_{DPF}=0$), the SOx purge rich flag $F_{SPR}$ becomes on, too, so that the interval $T_{F\_INT}$ calculated in the feedback manner upon previous SOx purge control is once reset. That is, at first-time control immediately after the filter forced regeneration, the exhaust pipe injection or the post injection is executed (refer to time $t_1$ to $t_2$ in FIG. 5), in correspondence to the injection time period $T_{F\_INJ\_1}$ set by the injection time period setting map. In this way, since the SOx purge control is started from the SOx purge rich control without performing the SOx purge lean control, the control is rapidly shifted to the SOx purge control without lowering the exhaust temperature, which has been increased by the filter forced regeneration, so that it is possible to reduce the fuel consumption.

Then, when the SOx purge rich flag $F_{SPR}$ becomes off as the injection time period $T_{F\_INJ\_1}$ has elapsed, the SOx purge rich flag $F_{SPR}$ is kept at the off-state until an interval $T_{F\_INT\_1}$ set by the PID control elapses (refer to time $t_2$ to $t_3$ in FIG. 5). Also, when the SOx purge rich flag $F_{SPR}$ becomes on as the interval $T_{F\_INT\_1}$ has elapsed, the exhaust pipe injection or the post injection corresponding to an injection time period $T_{F\_INJ\_2}$ is again executed (refer to time $t_3$ to $t_4$ in FIG. 5). Thereafter, the on/off switching of the SOx purge rich flag $F_{SPR}$ is repeatedly executed until the SOx purge flag $F_{SP}$ becomes off (refer to time $t_n$ in FIG. 5) by ending determination of the SOx purge control (which will be described later).

In this way, in the illustrative embodiment, the injection time period $T_{F\_INJ}$ in which the catalyst temperature is increased and the air excess ratio is lowered to the second target air excess ratio is set from the map that is referred to on the basis of the operating state of the engine 10, and the interval $T_{F\_INT}$ in which the catalyst temperature is lowered is processed by the PID control. Thereby, while effectively maintaining the catalyst temperature during the SOx purge control within a desired temperature range necessary for the purge, it is possible to securely lower the air excess ratio to the target excess ratio.

[Ending Determination of SOx Purge Control]

When any one of conditions that (1) the injection amounts of the exhaust pipe injection or the post injection are cumulated from the on-state of the SOx purge flag $F_{SP}$ and the cumulated injection amount reaches a predetermined upper limit threshold value amount, (2) the elapse time measured from the start of the SOx purge control reaches predetermined upper limit threshold value time and (3) a SOx occlusion amount of the NOx-occlusion-reduction-type catalyst 32, which is calculated on the basis of a predetermined model equation including, as input signals, an operating state of the engine 10, a sensor value of the NOx/lambda sensor 45 and the like, is lowered to a predetermined threshold value indicative of SOx removal success is satisfied, the SOx purge flag $F_{SP}$ is set to an off-state and the SOx purge control is over (refer to time $t_4$ in FIG. 2 and time $t_n$ in FIG. 5).

In this way, in the illustrative embodiment, the upper limits of the cumulated injection amount and the elapse time are provided with respect to the ending conditions of the SOx purge control, so that it is possible to effectively prevent the fuel from being excessively consumed when the SOx purge is not progressed due to the decrease in the exhaust temperature and the like.

[NOx Purge Control]

The NOx purge control unit 70 is configured to execute control of enriching the exhaust, detoxifying and releasing NOx, which is occluded in the NOx-occlusion-reduction-type catalyst 32, by reduction and purification, thereby recovering a NOx occlusion capacity of the NOx-occlusion-reduction-type catalyst 32 (hereinafter, the control is referred to as 'NOx purge control').

A NOx purge flag $F_{NP}$ for starting the NOx purge control becomes on (refer to time $t_1$ in FIG. 6) when a NOx emission amount per unit time is estimated from an operating state of the engine 10 and an estimated cumulative value ΣNOx obtained by cumulatively calculating the emission amounts exceeds a predetermined threshold value. Alternatively, when a NOx conversion efficiency by the NOx-occlusion-reduction-type catalyst 32 is calculated from a NOx emission amount of a catalyst upstream side, which is estimated from the operating state of the engine 10, and a NOx amount of a catalyst downstream side, which is detected by the NOx/lambda sensor 45, and the NOx conversion efficiency becomes below a predetermined determination threshold value, the NOx purge flag $F_{NP}$ becomes on.

In the illustrative embodiment, the enriching of the exhaust by the NOx purge control is implemented by concurrently using NOx purge lean control of lowering an air excess ratio from a value (for example, about 1.5) upon normal operation to a third target air excess ratio (for example, about 1.3) closer to a lean side than a theoretical air-fuel ratio equivalent value (about 1.0) by air system control and NOx purge rich control of lowering the air excess ratio from the third target air excess ratio to a fourth target air excess ratio (for example, about 0.9) of a rich side by injection system control. Hereinafter, the NOx purge lean control and the NOx purge rich control are described in detail.

[Setting of MAF Target Value in NOx Purge Lean Control]

FIG. 7 is a block diagram depicting setting processing of an MAF target value $MAF_{NPL\_Trgt}$ upon NOx purge lean control. A third target air excess ratio setting map 71 is a map that is to be referred to on the basis of an engine revolution Ne and an accelerator opening degree Q, and an air excess ratio target value $\lambda_{NPL\_Trgt}$ (third target air excess ratio) upon NOx purge lean control corresponding to the engine revolution Ne and the accelerator opening degree Q is set in advance by a test and the like.

First, the air excess ratio target value $\lambda_{NPL\_Trgt}$ upon NOx purge lean control is read from the third target air excess ratio setting map 71, in response to the engine revolution Ne and the accelerator opening degree Q, which are input signals, and is then input to an MAF target value calculation unit 72. Also, the MAF target value calculation unit 72 calculates an MAF target value $MAF_{NPL\_Trgt}$ upon NOx purge lean control, based on an equation (3).

$$MAF_{NPL\_Trgt} = \lambda_{NPL\_Trgt} \times Q_{fnl\_corrd} \times Ro_{Fuel} \times AFR_{sto} / Maf_{\_corr} \quad (3)$$

In the equation (3), $Q_{fnl\_corrd}$ indicates a learning-corrected fuel injection amount (the post injection is excluded) (which will be described later), $Ro_{Fuel}$ indicates a fuel specific gravity, $AFR_{sto}$ indicates a theoretical air-fuel ratio, and $Maf_{\_corr}$ indicates an MAF correction coefficient (which will be described later).

The MAF target value $MAF_{NPL\_Trgt}$ calculated by the MAF target value calculation unit 72 is input to a ramp processing unit 73 when the NOx purge flag $F_{NP}$ becomes on (refer to time $t_1$ in FIG. 6). The ramp processing unit 73 is configured to read a ramp coefficient from each of ramp coefficient maps 73A, 73B, in response to the engine revolution Ne and the accelerator opening degree Q, which are input signals, and to input an MAF target ramp value $MAF_{NPL\_Trgt\_Ramp}$ to which the ramp coefficient is added to a valve control unit 74.

The valve control unit 74 is configured to execute feedback control of narrowing the intake throttle valve 16 towards a close side and widening the EGR valve 24 towards an open side so that an actual MAF value $MAF_{Act}$ input from the MAF sensor 40 becomes the MAF target ramp value $MAF_{NPL\_Trgt\_Ramp}$.

In this way, in the embodiment, the MAF target value $MAF_{NPL\_Trgt}$ is set on the basis of the air excess ratio target value $\lambda_{NPL\_Trgt}$, which is to be read from the first target air excess ratio setting map 71, and the fuel injection amount of each in-cylinder injector 11, and the air system operation is controlled in the feedback manner on the basis of the MAF target value $MAF_{NPL\_Trgt}$. Thereby, it is possible to effectively lower the exhaust to a desired air excess ratio necessary for the NOx purge lean control without providing a lambda sensor at an upstream side of the NOx-occlusion-reduction-type catalyst 32 or without using a sensor value of a lambda sensor even when the lambda sensor is provided at the upstream side of the NOx-occlusion-reduction-type catalyst 32.

Also, the fuel injection amount $Q_{fnl\_corrd}$ after the learning correction is used as the fuel injection amount of each in-cylinder injector 11, so that it is possible to set the MAF target value $MAF_{NPL\_Trgt}$ in the feed-forward control manner. Therefore, it is possible to effectively exclude influences such as aging degradation and characteristic change of each in-cylinder injector 11.

Also, the ramp coefficient, which is to be set in correspondence to the operating state of the engine 10, is added to the MAF target value $MAF_{NPL\_Trgt}$, so that it is possible to effectively prevent accident fire of the engine 10 due to a rapid change in the intake air amount, deterioration of drivability due to torque variation, and the like.

[Setting of Fuel Injection Amount in NOx Purge Rich Control]

FIG. 8 is a block diagram depicting setting processing of a target injection amount $Q_{NPR\_Trgt}$ (injection amount per unit time) of the exhaust pipe injection or the post injection upon NOx purge rich control. A fourth target air excess ratio setting map 75 is a map that is to be referred to on the basis of the engine revolution Ne and the accelerator opening degree Q, and an air excess ratio target value $\lambda_{NPR\_Trgt}$ (fourth target air excess ratio) upon NOx purge rich control corresponding to the engine revolution Ne and the accelerator opening degree Q is set in advance by a test and the like.

First, the air excess ratio target value $\lambda_{NPR\_Trgt}$ upon NOx purge rich control is read from the fourth target air excess ratio setting map 75, in response to the engine revolution Ne and the accelerator opening degree Q, which are input signals, and is then input to an injection amount target value calculation unit 76. Also, the injection amount target value calculation unit 76 calculates a target injection amount instruction value $Q_{NPR\_Trgt}$ upon NOx purge rich control, based on an equation (4).

$$Q_{NPR\_Trgt} = MAF_{NPL\_Trgt} \times Maf_{\_corr} / (\lambda_{NPR\_Trgt} \times Ro_{Fuel} \times AFR_{sto}) - Q_{fnl\_corrd} \quad (4)$$

In the equation (4), $MAF_{NPL\_Trgt}$ is input from the MAF target value calculation unit 72, as a NOx purge lean MAF target value. Also, $Q_{fnl\_corrd}$ indicates a learning-corrected fuel injection amount (the post injection is excluded) before an MAF follow-up control is applied, $Ro_{Fuel}$ indicates a fuel specific gravity, $AFR_{sto}$ indicates a theoretical air-fuel ratio, and $Maf_{corr}$ indicates an MAF correction coefficient (which will be described later).

The target injection amount instruction value $Q_{NPR\_Trgt}$ calculated by the injection amount target value calculation unit 66 is transmitted to the exhaust injector 34 or each in-cylinder injector 11, as an injection instruction signal, when the NOx purge flag $F_{NP}$ becomes on, as shown at time $t_1$ in FIG. 6 (hereinafter, particularly, an injection amount instruction value of the post injection to be transmitted to the in-cylinder injector 11 is referred to as 'NOx purge rich/post injection amount instruction value $Q_{NPR\_Post\_Trgt}$'). The NOx purge rich/post injection amount instruction value $Q_{NPR\_Post\_Trgt}$ is transmitted to the catalyst temperature estimation unit 80, too, which will be described in detail later, so as to estimate a catalyst heat generation amount.

In this way, in the illustrative embodiment, the target injection amount $Q_{NPR\_Trgt}$ is set on the basis of the air excess ratio target value $\lambda_{NPR\_Trgt}$, which is to be read from the fourth target air excess ratio setting map 75, and the fuel injection amount of each in-cylinder injector 11. Thereby, it is possible to effectively lower the exhaust to a desired air excess ratio necessary for the NOx purge rich control without providing a lambda sensor at the upstream side of the NOx-occlusion-reduction-type catalyst 32 or without using a sensor value of a lambda sensor even when the lambda sensor is provided at the upstream side of the NOx-occlusion-reduction-type catalyst 32.

Also, the fuel injection amount $Q_{fnl\_corrd}$ after the learning correction is used as the fuel injection amount of each in-cylinder injector 11, so that it is possible to set the target injection amount $Q_{NPR\_Trgt}$ in the feed-forward control manner. Therefore, it is possible to effectively exclude influences such as aging degradation and characteristic change of each in-cylinder injector 11.

[Ending Determination of NOx Purge Control]

When any one of conditions that (1) the injection amounts of the exhaust pipe injection or the post injection are cumulated from the on-state of the NOx purge flag $F_{NP}$ and the cumulated injection amount reaches a predetermined upper limit threshold value amount, (2) the elapse time measured from the start of the NOx purge control reaches predetermined upper limit threshold value time and (3) a NOx occlusion amount of the NOx-occlusion-reduction-type catalyst 32, which is calculated on the basis of a predetermined model equation including, as input signals, an operating state of the engine 10, a sensor value of the NOx/lambda sensor 45 and the like, is lowered to a predetermined threshold value indicative of NOx removal success is satisfied, the NOx purge flag $F_{NP}$ is set to an off-state and the NOx purge control is over (refer to time $t_2$ in FIG. 6).

In this way, in the illustrative embodiment, the upper limits of the cumulated injection amount and the elapse time are provided with respect to the ending conditions of the NOx purge control, so that it is possible to securely prevent the fuel from being excessively consumed when the NOx purge fails due to the decrease in the exhaust temperature and the like.

[Setting of Heat Generation Amount Correction Value]

FIG. 9A is a block diagram depicting setting processing of a heat generation amount correction value. The heat generation amount correction value setting unit 100 is an example of the correction value obtaining means of the disclosure, and is configured to obtain a heat generation amount correction value, which is used to correct the heat generation amount of the NOx-occlusion-reduction-type catalyst 32, on the basis of an estimated catalyst temperature estimated by the catalyst temperature estimation unit 80 (an example of the catalyst temperature estimation means) and an actual exhaust temperature detected by the second exhaust temperature sensor 44 (an example of the exhaust temperature detection means) during implementation of the filter regeneration processing by the filter regeneration control unit 51 (an example of the filter regeneration means) and during implementation of the catalyst regeneration processing by the SOx purge control unit 60 (an example of the catalyst regeneration means).

A heat generation amount $HG_{LNT}$ of the NOx-occlusion-reduction-type catalyst 32 can be defined by an equation (5).

[Mathematical Formula 1]

$$H_{GLNT} = \int T_{LNT} \cdot C_{LNT} \cdot M_{LNT} \tag{5}$$

In the equation (5), $T_{LNT}$ indicates a temperature of the NOx-occlusion-reduction-type catalyst 32 but is substantially the same as an actual exhaust temperature, which is to be detected by the second exhaust temperature sensor 44, in the illustrative embodiment, as described above. Also, $C_{LNT}$ indicates a thermal capacity of the NOx-occlusion-reduction-type catalyst 32, and $M_{LNT}$ indicates a weight of the NOx-occlusion-reduction-type catalyst 32. Since $C_{LNT}$ and $M_{LNT}$ are fixed values, a heat generation amount ratio $HG_{ratio}$, which is a ratio of a detected value and an estimated value of the NOx-occlusion-reduction-type catalyst 32, can be defined by an equation (6).

[Mathematical Formula 2]

$$HG_{ratio} = \frac{\int Temp_{\_DPF\_est}}{\int Temp_{\_DPF\_act}} \tag{6}$$

In the equation (6), $\int Temp_{\_DPF\_est}$ indicates an estimated catalyst temperature of the NOx-occlusion-reduction-type catalyst 32 obtained by the catalyst temperature estimation unit 80 (NOx catalyst temperature estimation unit 87B). Also, $\int Temp_{\_DPF\_act}$ indicates an exhaust temperature detected by the second exhaust temperature sensor 44.

The heat generation amount correction value setting unit 100 (a heat generation amount correction value calculation unit 101) is configured to obtain a heat generation amount correction value $HG_{corr}$ by calculating integral values of the heat generation amount ratio $HG_{ratio}$ during implementation of the filter regeneration processing by the filter regeneration control unit 51 (the filter regeneration means) and during implementation of the catalyst regeneration processing by the SOx purge control unit 60 (the catalyst regeneration means). For this reason, the heat generation amount correction value calculation unit 101 is input with the SOx purge flag $F_{SP}$, the filter forced regeneration flag $F_{DPF}$, and the detection signal from the second exhaust temperature sensor 44.

Also, the heat generation amount correction value setting unit 100 (the pseudo regeneration means) is configured to perform pseudo regeneration processing by maintaining a temperature of the NOx-occlusion-reduction-type catalyst 32 at a pseudo regeneration temperature lower than a sulfur separation temperature (the recovery temperature) and a PM combustion temperature (a catalyst temperature in the filter regeneration processing) before at least one of first-time catalyst regeneration processing and first-time filter regeneration processing is implemented. In the illustrative embodiment, the pseudo regeneration processing is performed on condition that an estimated PM accumulation amount obtained from the PM accumulation amount estimation unit 52 reaches 40% to 60% of the filter regeneration threshold value. In the below, setting processing of the heat generation amount correction value that is to be performed by the heat generation amount correction value setting unit 100 is described with reference to a flowchart of FIG. 10.

In step S100, it is determined whether the filter regeneration processing has not been implemented yet. In general, since the first-time SOx purge control is performed later than the first-time filter regeneration processing, the filter regeneration processing is set as a determination target, in the illustrative embodiment. It is determined whether the filter regeneration processing has not been implemented yet on the basis of a determination flag $F_{DPF\_FST}$, for example. The determination flag $F_{SP\_FST}$ is set to an off-state ($F_{DPF\_FST}=0$) upon factory shipment, and is set to an on-state ($F_{DPF\_FST}=1$) when the first-time filter regeneration processing is implemented. When the NOx-occlusion-reduction-type catalyst 32 is repaired or replaced, the determination flag $F_{DPF\_FST}$ is reset to the off-state ($F_{DPF\_FST}=0$).

When it is determined that the filter regeneration processing has not been implemented ($F_{DPF\_FST}=0$) (Y in S100), it is determined in step S110 whether the PM accumulation amount is equal to or greater than an initial accumulation amount threshold value (40% to 60% of the filter regeneration threshold value). When the PM accumulation amount is equal to or greater than the initial accumulation amount threshold value (Y in S110), processing of step S120 is executed, and when the PM accumulation amount is less than the initial accumulation amount threshold value (N in S110), processing of step 100 is executed.

In step 120, processing of the pseudo filter regeneration is started. In the illustrative embodiment, the heat generation amount correction value setting unit 100 outputs the injection instruction signal to the exhaust injector 34 or the in-cylinder injector 11, thereby increasing an unburnt fuel concentration in the exhaust. In the pseudo filter regeneration, the unburnt fuel injection is controlled so that the temperature is to be a pseudo regeneration temperature (about 500° C.) lower than the exhaust temperature (about 550° C.) upon the filter forced regeneration and the sulfur separation temperature (about 600° C.) upon the SOx purge.

During the implementation (N in S140) of the pseudo filter regeneration processing, the heat generation amount correction value setting unit 100 obtains the actual exhaust temperature from the second exhaust temperature sensor 44 and the estimated catalyst temperature from the catalyst temperature estimation unit 80 (S130).

When the pseudo filter regeneration processing is over (Y in S140), the heat generation amount correction value setting unit 100 calculates an initial correction value (S150). As described above, for calculation of the initial correction value, the heat generation amount ratio $HG_{ratio}$ of the equation (6) is used. However, the calculation of the heat generation amount ratio $HG_{ratio}$ is performed from temperature rising timings of the actual exhaust temperature and the estimated catalyst temperature until the actual exhaust temperature and the estimated catalyst temperature are lowered to a level equivalent to an inlet temperature of the oxidation catalyst 31 (a detected temperature of the first exhaust temperature sensor 43) after the pseudo filter regeneration processing is over. The calculated initial correction value $HG_{corr\_ini}$ (an example of the initial value of the heat generation amount correction value) is output to the catalyst temperature estimation unit 80 (NOx catalyst heat generation amount estimation unit 86B), so that it is used to estimate the heat generation amount and to estimate the NOx catalyst temperature in the NOx-occlusion-reduction-type catalyst 32.

When it is determined in step S100 that the filter regeneration processing has been already implemented ($F_{DPF\_FST}=1$) (N in S100), processing of step S160 is performed. In step S160, it is determined whether the filter forced regeneration flag $F_{DPF}$ is on ($F_{DPF}=1$) or not. Here, when it is determined that the filter forced regeneration flag $F_{DPF}$ is on (Y in S160), the processing proceeds to step 180. Also, when it is determined that the filter forced regeneration flag $F_{DPF}$ is off ($F_{DPF}=0$) (N in S160), the processing proceeds to step 170. In step S170, it is determined whether the SOx purge flag $F_{SP}$ is on ($F_{SP}=1$). Here, when it is determined that the SOx purge flag $F_{SP}$ is on (Y in S170), the processing proceeds to step 180. Also, when it is determined that the SOx purge flag $F_{SP}$ is off ($F_{SP}=0$) (N in S170), the processing proceeds to step S100. In summary, in steps S160 and S170, it is determined whether the filter forced regeneration flag $F_{DPF}$ or the SOx purge flag $F_{SP}$ is on or not, and when at least one flag is on, the processing of step S180 is performed.

In step S180, like step S130, the actual exhaust temperature from the second exhaust temperature sensor 44 and the estimated catalyst temperature from the catalyst temperature estimation unit 80 are obtained. This temperature obtaining processing is continuously performed until both the filter forced regeneration flag $F_{DPF}$ and the SOx purge flag $F_{SP}$ become off ($F_{DPF}=0$, $F_{SP}=0$) (S190, S200). When both the flags become off, the processing proceeds to step S210.

In step S210, a temporal correction value $HG_{corr\_sfo}$ is calculated. Here, the calculation processing is performed on the basis of the heat generation amount ratio $HG_{ratio}$, like the processing of step 150. The calculated temporal correction value $HG_{corr\_sfo}$ is output to the catalyst temperature estimation unit 80 (NOx catalyst heat generation amount estimation unit 86B), so that it is used to estimate the heat generation amount and to estimate the NOx catalyst temperature.

In this way, in the illustrative embodiment, since the heat generation amount correction value of the NOx-occlusion-reduction-type catalyst 32 is obtained during the implementation of the filter regeneration processing by the filter regeneration control unit 51 and during the implementation of the catalyst regeneration processing by the SOx purge control unit 60, it is possible to secure the sufficient heating time period so as to obtain the heat generation amount ratio. Thereby, when there is a difference between the heat generation amount of the NOx-occlusion-reduction-type catalyst 32 and the estimated heat generation amount of the catalyst temperature estimation unit 80 (NOx catalyst heat generation amount estimation unit 86B), it is possible to correctly obtain the difference. As a result, like the estimated heat generation amount $HG_{\_corr}$ after the correction, which is shown in FIG. 9B, it is possible to accurately obtain the catalyst heat generation amount $HG_{\_act}$ that gradually decreases over time and to increase the estimation accuracy of the catalyst temperature.

Also, in the illustrative embodiment, since the pseudo regeneration processing is performed before the first-time filter regeneration processing or SOx purge processing, it is possible to securely prevent the temperature of the NOx-occlusion-reduction-type catalyst 32 from excessively increasing. Also, in the first-time filter regeneration processing or SOx purge processing, it is possible to perform the estimation processing with higher precision, as compared to a case where the initial heat generation amount $HG_{\_cal}$ shown in FIG. 9B is used.

[MAF Follow-Up Control]

The MAF follow-up control unit 77 is configured to execute control (referred to as 'MAF follow-up control') of correcting a fuel injection timing and a fuel injection amount of each in-cylinder injector 11 in correspondence to MAF change (1) for a switching time period from a lean state of normal operation to a rich state by the SOx purge control or the NOx purge control and (2) for a switching time period from the rich state by the SOx purge control or the NOx purge control to the lean state of normal operation.

[Injection Amount Learning Correction]

As shown in FIG. 11, the injection amount learning correction unit 90 includes a learning correction coefficient calculation unit 91 and an injection amount correction unit 92.

The learning correction coefficient calculation unit 91 is configured to calculate a learning correction coefficient $F_{Corr}$ of the fuel injection amount, based on an error $\Delta\lambda$ between an actual lambda value $\lambda_{Act}$, which is to be detected by the NOx/lambda sensor 45 upon lean operation of the engine 10, and an estimated lambda value $\lambda_{Est}$. When the exhaust is in the lean state, an HC concentration in the exhaust is very small, so that a change in exhaust lambda value due to an oxidation reaction of HC in the oxidation catalyst 31 is negligible small. For this reason, it is thought that the actual lambda value $\lambda_{Act}$ in the exhaust, which passes through the oxidation catalyst 31 and is detected by the downstream-side NOx/lambda sensor 45, coincides with the estimated lambda value $\lambda_{Est}$ in the exhaust emitted from the engine 10. For this reason, when the error $\Delta\lambda$ occurs between the actual lambda value $\lambda_{Act}$ and the estimated lambda value $\lambda_{Est}$, it can be assumed that the error is caused due to a difference between an instructed injection amount to each in-cylinder injector 11 and an actual injection amount. In the below, learning correction coefficient calculation processing, which is to be performed using the error $\Delta\lambda$ by the learning correction coefficient calculation unit 91, is described with reference to a flowchart of FIG. 12.

In step S300, it is determined whether the engine 10 is in a lean operating state, based on the engine revolution Ne and the accelerator opening degree Q. When it is determined that the engine is in the lean operating state, the learning correction coefficient calculation unit proceeds to step S310 so as to start learning correction coefficient calculation.

In step S310, a learning value $F_{CorrAdpt}$ is calculated ($F_{CorrAdpt}=(\lambda_{Est}-\lambda_{Act})\times K_1 \times K_2$) by multiplying the error $\Delta\lambda$, which is obtained by subtracting the actual lambda value $\lambda_{Act}$ detected at the NOx/lambda sensor 45 from the estimated lambda value $\lambda_{Est}$, by a learning value gain $K_1$ and a correction sensitivity coefficient $K_2$. The estimated lambda value $\lambda_{Est}$ is estimated and calculated from the operating state of the engine 10 corresponding to the engine revolution Ne and the accelerator opening degree Q. Also, the correction sensitivity coefficient $K_2$ is read from a correction sensitivity coefficient map 91A shown in FIG. 11, in response to the actual lambda value $\lambda_{Act}$ detected at the NOx/lambda sensor 45, which is an input signal.

In step S320, it is determined whether an absolute value $|F_{CorrAdpt}|$ of the learning value $F_{CorrAdpt}$ is within a range of a predetermined correction limit value A. When it is determined that the absolute value $|F_{CorrAdpt}|$ exceeds the correction limit value A, the control returns and this learning is stopped.

In step S330, it is determined whether a learning prohibition flag $F_{Pro}$ is off. As the learning prohibition flag $F_{Pro}$, for example, a transient operation of the engine 10, the SOx purge control ($F_{SP}=1$) and the like are exemplified. The reason is that when the corresponding conditions are satisfied, the error $\Delta\lambda$ increases due to a change in the actual lambda value $\lambda_{Act}$, so that the correct learning cannot be performed. Regarding the determination as to whether the engine 10 is in the transient operation, based on a temporal change amount of the actual lambda value $\lambda_{Act}$ detected at the NOx/lambda sensor 45, when the temporal change amount is greater than a predetermined threshold value, it may be determined that the engine is in the transient operation.

In step S340, a learning value map 91B (refer to FIG. 11), which is referred to on the basis of the engine revolution Ne and the accelerator opening degree Q, is updated to the learning value $F_{CorrAdpt}$ calculated in step S310. More specifically, in the learning value map 91B, a plurality of learning regions divided in correspondence to the engine revolution Ne and the accelerator opening degree Q is set. The learning regions are preferably set to be narrower as use frequencies thereof are higher and to be wider as use frequencies thereof are lower. Thereby, the learning accuracy is improved in the region of which use frequency is high and it is possible to effectively prevent the non-learning in the region of which use frequency is low.

In step S350, in response to the engine revolution Ne and the accelerator opening degree Q, which are input signals, "1" is added to the learning value read from the learning value map 91B, so that a learning correction coefficient $F_{Corr}$ is calculated ($F_{Corr}=1+F_{CorrAdpt}$). The learning correction coefficient $F_{Corr}$ is input to the injection amount correction unit 92 shown in FIG. 11.

The injection amount correction unit 92 multiplies respective basic injection amounts of pilot injection $Q_{Pilot}$, pre-injection $Q_{Pre}$, main injection $Q_{Main}$, after-injection $Q_{After}$ and post injection $Q_{Post}$ by the learning correction coefficient $F_{Corr}$, thereby correcting the fuel injection amounts.

In this way, the fuel injection amount to each in-cylinder injector 11 is corrected by the learning value corresponding to the error $\Delta\lambda$ between the estimated lambda value $\lambda_{Est}$ and the actual lambda value $\lambda_{Act}$, so that it is possible to effectively exclude the non-uniformity such as aging degradation, characteristic change, individual difference and the like of each in-cylinder injector 11.

[Catalyst Temperature Estimation]

FIG. 13 is a block diagram depicting estimation processing of the oxidation catalyst temperature and the NOx catalyst temperature, which is to be performed by the catalyst temperature estimation unit 80. The catalyst temperature estimation unit 80 is an example of the catalyst temperature estimation means of the disclosure, and is configured to estimate the catalyst temperature, based on an amount of the unburnt fuel contained in the exhaust and the heat generation amount of the oxidation catalyst 31 or the NOx-occlusion-reduction-type catalyst 32.

A lean-time HC map 81A is a map that is to be referred to on the basis of the operating state of the engine 10, and a HC amount (hereinafter, referred to as 'lean-time HC emission amount') to be emitted from the engine 10 upon the lean operation is set therein in advance by a test and the like. When the filter forced regeneration flag $F_{DPF}$, the SOx purge flag $F_{SP}$ and the NOx purge flag $F_{NP}$ are all off ($F_{DPF}=0$, $F_{SP}=0$, $F_{NP}=0$), the lean-time HC emission amount read from the lean-time HC map 81A on the basis of the engine revolution Ne and the accelerator opening degree Q is transmitted to each of the heat generation amount estimation units 86A, 86B.

A lean-time CO map 81B is a map that is to be referred to on the basis of the operating state of the engine 10, and a CO amount (hereinafter, referred to as 'lean-time CO emission amount') to be emitted from the engine 10 upon the lean operation is set therein in advance by a test and the like. When the filter forced regeneration flag $F_{DPF}$, the SOx purge flag $F_{SP}$ and the NOx purge flag $F_{NP}$ are all off ($F_{DPF}$=0, $F_{SP}$=0, $F_{NP}$=0), the lean-time CO emission amount read from the lean-time CO map 81B on the basis of the engine revolution Ne and the accelerator opening degree Q is transmitted to the oxidation catalyst heat generation amount estimation unit 86A and the NOx catalyst heat generation amount estimation unit 86B.

A filter forced regeneration-time HC map 82A is a map that is to be referred to on the basis of the operating state of the engine 10, and a HC amount (hereinafter, referred to as 'filter regeneration-time HC emission amount') to be emitted from the engine 10 upon implementation of the filter forced regeneration control is set therein in advance by a test and the like. When the filter forced regeneration flag $F_{DPF}$ is on ($F_{DPF}$=1), the filter regeneration-time HC emission amount read from the filter forced regeneration-time HC map 82A on the basis of the engine revolution Ne and the accelerator opening degree Q is multiplied by a predetermined correction coefficient corresponding to the operating state of the engine 10, which is then transmitted to the oxidation catalyst heat generation amount estimation unit 86A and the NOx catalyst heat generation amount estimation unit 86B.

A filter forced regeneration-time CO map 82B is a map that is to be referred to on the basis of the operating state of the engine 10, and a CO amount (hereinafter, referred to as 'filter regeneration-time CO emission amount') to be emitted from the engine 10 upon implementation of the filter forced regeneration control is set therein in advance by a test and the like. When the filter forced regeneration flag $F_{DPF}$ is on ($F_{DPF}$=1), the filter regeneration-time CO emission amount read from the filter forced regeneration-time CO map 82B on the basis of the engine revolution Ne and the accelerator opening degree Q is multiplied by a predetermined correction coefficient corresponding to the operating state of the engine 10, which is then transmitted to the oxidation catalyst heat generation amount estimation unit 86A and the NOx catalyst heat generation amount estimation unit 86B.

A NOx purge-time HC map 83A is a map that is to be referred to on the basis of the operating state of the engine 10, and a HC amount (hereinafter, referred to as 'NOx purge-time HC emission amount') to be emitted from the engine 10 upon implementation of the NOx purge control is set therein in advance by a test and the like. When the NOx purge flag $F_{NP}$ is on ($F_{NP}$=1), the NOx purge-time HC emission amount read from the NOx purge-time HC map 83A on the basis of the engine revolution Ne and the accelerator opening degree Q is multiplied by a predetermined correction coefficient corresponding to the operating state of the engine 10, which is then transmitted to the oxidation catalyst heat generation amount estimation unit 86A and the NOx catalyst heat generation amount estimation unit 86B.

A NOx purge-time CO map 83B is a map that is to be referred to on the basis of the operating state of the engine 10, and a CO amount (hereinafter, referred to as 'NOx purge-time CO emission amount') to be emitted from the engine 10 upon implementation of the NOx purge control is set therein in advance by a test and the like. When the NOx purge flag $F_{NP}$ is on ($F_{NP}$=1), the NOx purge-time CO emission amount read from the NOx purge-time CO map 83B on the basis of the engine revolution Ne and the accelerator opening degree Q is multiplied by a predetermined correction coefficient corresponding to the operating state of the engine 10, which is then transmitted to the oxidation catalyst heat generation amount estimation unit 86A and the NOx catalyst heat generation amount estimation unit 86B.

A SOx purge-time HC map 84A is a map that is to be referred to on the basis of the operating state of the engine 10, and a HC amount (hereinafter, referred to as 'SOx purge-time HC emission amount') to be emitted from the engine 10 upon implementation of the SOx purge control is set therein in advance by a test and the like. When the SOx purge flag $F_{SP}$ is on ($F_{SP}$=1), the SOx purge-time HC emission amount read from the SOx purge-time HC map 84A on the basis of the engine revolution Ne and the accelerator opening degree Q is multiplied by a predetermined correction coefficient corresponding to the operating state of the engine 10, which is then transmitted to the oxidation catalyst heat generation amount estimation unit 86A and the NOx catalyst heat generation amount estimation unit 86B.

A SOx purge-time CO map 84B is a map that is to be referred to on the basis of the operating state of the engine 10, and a CO amount (hereinafter, referred to as 'SOx purge-time CO emission amount') to be emitted from the engine 10 upon implementation of the SOx purge control is set therein in advance by a test and the like. When the SOx purge flag $F_{SP}$ is on ($F_{SP}$=1), the SOx purge-time CO emission amount read from the SOx purge-time CO map 84B on the basis of the engine revolution Ne and the accelerator opening degree Q is multiplied by a predetermined correction coefficient corresponding to the operating state of the engine 10, which is then transmitted to the oxidation catalyst heat generation amount estimation unit 86A and the NOx catalyst heat generation amount estimation unit 86B.

The post injection amount instruction value correction unit 85 implements post injection amount instruction value correction of correcting a post injection amount instruction value, which is used to estimate the catalyst heat generation amount, by the learning correction coefficient input from the learning correction coefficient calculation unit 91 when the SOx purge rich control, the NOx purge rich control or the filter forced regeneration control is implemented by the post injection.

More specifically, when the SOx purge rich flag $F_{SPR}$ becomes on and the SOx purge rich control is implemented by the post injection, a corrected post injection amount instruction value $Q_{SPR\_Post\_Corr}$ (=$Q_{SPR\_Post\_Trgt} \times F_{Corr}$), which is obtained by multiplying the SOx purge rich/post injection amount instruction value $Q_{SPR\_Post\_Trgt}$ input from the injection amount target value calculation unit 66 (the SOx purge control unit 60) by the learning correction coefficient $F_{Corr}$, is transmitted to the oxidation catalyst heat generation amount estimation unit 86A and the NOx catalyst heat generation amount estimation unit 86B.

Also, when the NOx purge rich flag $F_{NPR}$ becomes on and the NOx purge rich control is implemented by the post injection, a corrected post injection amount instruction value $Q_{NPR\_Post\_Corr}$ (=$Q_{NPR\_Post\_Trgt} \times F_{Corr}$), which is obtained by multiplying the NOx purge rich/post injection amount instruction value $Q_{NPR\_Post\_Trgt}$ input from the injection amount target value calculation unit 76 (NOx purge control unit 70) by the learning correction coefficient $F_{Corr}$, is transmitted to the oxidation catalyst heat generation amount estimation unit 86A and the NOx catalyst heat generation amount estimation unit 86B.

Also, when the filter forced regeneration flag $F_{DPF}$ becomes on and the filter forced regeneration control is implemented by the post injection, a corrected post injection amount instruction value $Q_{DPF\_Post\_Corr}$ (=$Q_{DPF\_Post\_Trgt} \times F_{Corr}$), which is obtained by multiplying the filter regeneration post injection amount instruction value $Q_{DPF\_Post\_Trgt}$ input from the filter regeneration control unit 51 by the learning correction coefficient $F_{Corr}$, is transmitted to the oxidation catalyst heat generation amount estimation unit 86A and the NOx catalyst heat generation amount estimation unit 86B.

The oxidation catalyst heat generation amount estimation unit 86A is configured to estimate a HC/CO heat generation amount (hereinafter, referred to as 'oxidation catalyst HC/CO heat generation amount') in the oxidation catalyst 31, based on the HC/CO emission amounts, which are input from the respective maps 81A to 84B in correspondence to the on and off states of the SOx purge flag $F_{SP}$, the NOx purge flag $F_{NP}$ and the filter forced regeneration flag $F_{DPF}$, the corrected post injection amount instruction value, which is input from the post injection amount instruction value correction unit 85 in correspondence to selection of the exhaust pipe injection and the post injection, and the like. The oxidation catalyst HC/CO heat generation amount is estimated and calculated on the basis of a model equation including, as input values, the HC/CO emission amount and the corrected post injection amount instruction value, and a map, for example.

The NOx catalyst heat generation amount estimation unit 86B is configured to estimate a HC/CO heat generation amount (hereinafter, referred to as 'NOx catalyst HC/CO heat generation amount') in the NOx-occlusion-reduction-type catalyst 32, based on the HC/CO emission amounts, which are input from the respective maps 81A to 84B in correspondence to the on and off states of the SOx purge flag $F_{SP}$, the NOx purge flag $F_{NP}$ and the filter forced regeneration flag $F_{DPF}$, the corrected post injection amount instruction value, which is input from the post injection amount instruction value correction unit 85 in correspondence to selection of the exhaust pipe injection and the post injection, and the like. The NOx catalyst HC/CO heat generation amount is estimated and calculated on the basis of a model equation including, as input values, the HC/CO emission amount and the corrected post injection amount instruction value, and a map, for example. In the estimation and calculation, the lowering of the heat generation amount due to aging degradation of the NOx-occlusion-reduction-type catalyst 32 is corrected by referring to the heat generation amount correction value set by the heat generation amount correction value setting unit 100. Thereby, it is possible to increase the accuracy of the HC/CO heat generation amount to be estimated and calculated.

The oxidation catalyst temperature estimation unit 87A is configured to estimate and calculate the catalyst temperature of the oxidation catalyst 31, based on a model equation including, as input values, the oxidation catalyst inlet temperature detected by the first exhaust temperature sensor 43, the oxidation catalyst HC/CO heat generation amount input from the oxidation catalyst heat generation amount estimation unit 86A, the sensor value of the MAP sensor 40, a heat radiation amount to the exterior air, which is estimated from the sensor value of the exterior air temperature sensor 47 or the intake temperature sensor 48, and the like, and a map.

The NOx catalyst temperature estimation unit 87B is configured to estimate and calculate the catalyst temperature of the NOx-occlusion-reduction-type catalyst 32, based on a model equation including, as input values, the oxidation catalyst temperature (hereinafter, referred to as 'NOx catalyst inlet temperature') input from the oxidation catalyst temperature estimation unit 87A, the NOx catalyst HC/CO heat generation amount input from the NOx catalyst heat generation amount estimation unit 86B, a heat radiation amount to the exterior air, which is estimated from the sensor value of the exterior air temperature sensor 47 or the intake temperature sensor 48, and the like, and a map.

As described in detail above, in the illustrative embodiment, when the SOx purge control, the NOx purge control and the filter forced regeneration control are implemented by the post injection, the corrected post injection amount instruction value in which the learning correction value is reflected is used to estimate and calculate the heat generation amounts of the oxidation catalyst 31 and the NOx-occlusion-reduction-type catalyst 32. Thereby, it is possible to calculate the catalyst heat generation amount with high precision, considering the influences such as aging degradation of the in-cylinder injector 11. Therefore, it is possible to securely improve the temperature estimation accuracy of the oxidation catalyst 31 and the NOx-occlusion-reduction-type catalyst 32.

Also, the HC/CO maps 81A to 84B are appropriately switched, in correspondence to the respective operating states such as the normal lean operation, the filter forced regeneration, the SOx purge and the NOx purge in which the HC/CO emission amounts are different, so that it is possible to accurately calculate the HC/CO heat generation amount in the catalyst corresponding to the operating states. Therefore, it is possible to effectively improve the temperature estimation accuracy of the oxidation catalyst 31 and the NOx-occlusion-reduction-type catalyst 32.

[FB Control Reference Temperature Selection]

The reference temperature selection unit 88 shown in FIG. 13 is configured to select a reference temperature that is used for the temperature feedback control of the filter forced regeneration and SOx purge.

In the exhaust purification system including the oxidation catalyst 31 and the NOx-occlusion-reduction-type catalyst 32, the HC/CO heat generation amounts are different in the respective catalysts 31, 32, in correspondence to heat generation characteristics and the like of the catalysts. For this reason, as the reference temperature of the temperature feedback control, it is preferably to select a temperature of the catalyst having a greater heat generation amount, from a standpoint of improving controllability.

The reference temperature selection unit 88 is configured to select a temperature of the catalyst, which has a greater heat generation amount estimated from the operating state of the engine 10, of the oxidation catalyst temperature and the NOx catalyst temperature, and to transmit the selected catalyst temperature to the filter regeneration control unit 51, the SOx purge control unit 60, the NOx purge control unit 70 and the heat generation amount correction value setting unit 100, as the reference temperature of the temperature feedback control More specifically, during the filter forced regeneration in which an oxygen concentration in the exhaust is relatively high and the HC/CO heat generation amount of the oxidation catalyst 31 increases, the oxidation catalyst temperature that is input from the oxidation catalyst temperature estimation unit 87A is selected as the reference temperature of the temperature feedback control. On the other hand, during the SOx purge rich control or the NOx purge rich control in which the HC/CO heat generation amount of the NOx-occlusion-reduction-type catalyst 32 increases due to reduction of the oxygen concentration in the exhaust, the NOx catalyst temperature that is input from the NOx catalyst temperature estimation unit 87B is selected as the reference temperature of the temperature feedback control.

In this way, in the illustrative embodiment, the temperature of the catalyst having a greater HC/CO heat generation amount is selected as the reference temperature of the temperature feedback control, so that it is possible to effectively improve the controllability.

[MAF Correction Coefficient]

The MAF correction coefficient calculation unit 95 is configured to calculate an MAF correction coefficient $Maf_{corr}$, which is to be used for the setting of the MAF target value $MAF_{SPL\_Trgt}$ and the target injection amount $Q_{SPR\_Trgt}$ upon the SOx purge control.

In the illustrative embodiment, the fuel injection amount of each in-cylinder injector 11 is corrected on the basis of the error $\Delta\lambda$ between the actual lambda value $\lambda_{Act}$ detected at the NOx/lambda sensor 45 and the estimated lambda value $\lambda_{Est}$. However, since the lambda is a ratio of air and fuel, it cannot be said that the error $\Delta\lambda$ is necessarily caused due to the difference between the instructed injection amount to each in-cylinder injector 11 and the actual injection amount. That is, the error $\Delta\lambda$ of the lambda may be influenced not only by each in-cylinder injector 11 but also an error of the MAF sensor 40.

FIG. 14 is a block diagram depicting setting processing of the MAF correction coefficient $Maf_{corr}$, which is to be performed by the MAF correction coefficient calculation unit 95. A correction coefficient setting map 96 is a map that is to be referred to on the basis of the engine revolution Ne and the accelerator opening degree Q, and an MAF correction coefficient $Maf_{corr}$ indicative of a sensor characteristic of the MAP sensor 40 corresponding to the engine revolution Ne and the accelerator opening degree Q is set in advance by a test and the like.

The MAF correction coefficient calculation unit 95 is configured to read the MAF correction coefficient $Maf_{corr}$ from the correction coefficient setting map 96, in response to the engine revolution Ne and the accelerator opening degree Q, which are input signals, and to transmit the MAF correction coefficient $Maf_{corr}$ to the MAF target value calculation unit 62 and the injection amount target value calculation unit 66. Thereby, it is possible to effectively reflect the sensor characteristics of the MAF sensor 40 when setting the MAF target value $MAF_{SPL\_Trgt}$ and the target injection amount $Q_{SPR\_Trgt}$ upon the SOx purge control.

[Others]

In the meantime, the present invention is not limited to the above illustrative embodiment and can be implemented with being appropriately modified without departing from the gist of the present invention.

For example, in the above illustrative embodiment, the NOx-occlusion-reduction-type catalyst 32 has been exemplified as the catalyst configured to purify the exhaust. However, the present invention can also be implemented for the other catalysts configured to heat generate and to purify the exhaust by the supply of the unburnt fuel.

The subject application is based on a Japanese Patent Application No. 2015-062527 filed on Mar. 25, 2015, the entire contents of which are incorporated herein by reference.

INDUSTRIAL APPLICABILITY

The present invention has the effect of increasing the estimation accuracy of the catalyst temperature and is useful for the exhaust purification device and the like.

DESCRIPTION OF REFERENCE NUMERALS AND SIGNS

10: engine
11: in-cylinder injector
12: intake passage
13: exhaust passage
16: intake throttle valve
24: EGR valve
31: oxidation catalyst
32: NOx-occlusion-reduction-type catalyst
33: filter
34: exhaust injector
40: MAP sensor
45: NOx/lambda sensor
50: ECU

The invention claimed is:

1. An exhaust purification device comprising:
a catalyst provided in an exhaust system of an internal combustion engine and configured to generate heat and to purify an exhaust by unburnt fuel in the exhaust;
an exhaust temperature detector that is arranged at a further exhaust downstream side than the catalyst and detects an exhaust temperature emitted from the catalyst;
a filter provided in the exhaust system of the internal combustion engine and configured to trap particulate matters in the exhaust; and
an electronic control unit operated to execute:
a catalyst regeneration processing of recovering a purification capacity of the catalyst by maintaining a temperature of the catalyst at a recovery temperature;
estimating a temperature of the catalyst on the basis of an amount of the unburnt fuel contained in the exhaust and a heat generation amount of the catalyst;
a filter regeneration processing of combusting and removing the particulate matters accumulated in the filter by maintaining the filter at a combustion temperature of the particulate matters;
obtaining a heat generation amount correction value, which is used to correct the heat generation amount of the catalyst, on the basis of the estimated temperature of the catalyst and an actual exhaust temperature detected by the exhaust temperature detector during implementation of the catalyst regeneration processing and during implementation of the filter regeneration processing; and
a pseudo regeneration processing of maintaining the temperature of the catalyst at a pseudo regeneration temperature lower than the recovery temperature of the catalyst and lower than the combustion temperature of the particulate matters in the filter regeneration processing before at least one of a first-time catalyst regeneration processing and a first-time filter regeneration processing is implemented,
wherein an initial value of the heat generation amount correction value is obtained when the pseudo regeneration processing is over.

2. The exhaust purification device according to claim 1, wherein the catalyst is a NOx reduction-type catalyst configured to reduce and purify NOx in the exhaust and to recover from sulfur poisoning as the catalyst is maintained at a sulfur separation temperature, and wherein the catalysts regeneration processing implements a catalyst regeneration control of recovering the NOx reduction-type catalyst from the sulfur poisoning by increasing an exhaust temperature of the internal combustion engine to the sulfur separation temperature.

3. A control method of an exhaust purification device comprising a catalyst provided in an exhaust system of an internal combustion engine and configured to generate heat and to purify an exhaust by unburnt fuel in the exhaust, and an exhaust temperature detection sensor arranged at a further exhaust downstream side than the catalyst and configured to detect an exhaust temperature emitted from the catalyst, the method comprising:

a catalyst regeneration processing of recovering a purification capacity of the catalyst by maintaining a temperature of the catalyst at a recovery temperature;

a catalyst temperature estimation processing of estimating the temperature of the catalyst on the basis of an amount of the unburnt fuel contained in the exhaust and a heat generation amount of the catalyst;

an exhaust temperature detection processing of detecting an exhaust temperature emitted from the catalyst at a further downstream side than the catalyst;

a filter regeneration processing of combusting and removing particulate matters accumulated in a filter by maintaining the filter at a combustion temperature of the particulate matters, the filter provided in the exhaust system of the internal combustion engine and configured to trap the particulate matters in the exhaust;

a correction value obtaining processing of obtaining a heat generation amount correction value, which is used to correct the heat generation amount of the catalyst, on the basis of an estimated catalyst temperature estimated by the catalyst temperature estimation processing and an actual exhaust temperature detected by the exhaust temperature detection sensor during implementation of the catalyst regeneration processing and during implementation of the filter regeneration processing; and performing a pseudo regeneration processing by maintaining the temperature of the catalyst at a pseudo regeneration temperature lower than the recovery temperature of the catalyst and lower than the combustion temperature of the particulate matters in the filter regeneration processing before at least one of a first-time catalyst regeneration processing and a first-time filter regeneration processing is implemented, wherein the correction value obtaining processing obtains an initial value of the heat generation amount correction value when the pseudo regeneration processing is over.

* * * * *